(12) United States Patent
Hosseini et al.

(10) Patent No.: US 11,576,192 B2
(45) Date of Patent: Feb. 7, 2023

(54) UPLINK CHANNEL PRIORITIZATION FOR PERIODIC HIGH PRIORITY UPLINK COMMUNICATIONS

(71) Applicant: QUALCOMM Incorporated, San Diego, CA (US)

(72) Inventors: Seyedkianoush Hosseini, San Diego, CA (US); Wei Yang, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 17/174,187

(22) Filed: Feb. 11, 2021

(65) Prior Publication Data
US 2021/0258981 A1   Aug. 19, 2021

Related U.S. Application Data

(60) Provisional application No. 62/976,943, filed on Feb. 14, 2020.

(51) Int. Cl.
*H04W 72/12* (2009.01)

(52) U.S. Cl.
CPC ... *H04W 72/1247* (2013.01); *H04W 72/1278* (2013.01)

(58) Field of Classification Search
CPC ............. H04W 36/06; H04W 72/1231; H04W 72/1247; H04W 72/1278; H04W 72/1242
See application file for complete search history.

(56) References Cited

U.S. PATENT DOCUMENTS

| 2019/0037577 | A1  | 1/2019  | Sun et al. |
| 2019/0261361 | A1* | 8/2019  | Xiong ............... H04W 72/02 |
| 2021/0321421 | A1* | 10/2021 | Osawa ............... H04W 72/10 |

OTHER PUBLICATIONS

Catt: "Data/Data Prioritization Rules and Framework", 3GPP Draft, 3GPP TSG-RAN WG2 Meeting #107, R2-1908826, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019 Aug. 16, 2019 (Aug. 16, 2019), XP051766648, pp. 1-4, Retrieved from the Internet: URL:http://www.3gpp.org/ftp/tsg_ran/WG2_RL2/TSGR2_107/Docs/R2-1908826.zip [retrieved on Aug. 16, 2019] section 2 .1.1, figure 1.

(Continued)

*Primary Examiner* — Anez C Ebrahim
(74) *Attorney, Agent, or Firm* — Holland & Hart LLP

(57) ABSTRACT

Methods, systems, and devices for wireless communications are described that provide for prioritization of uplink transmissions in the event that periodic configured uplink transmissions of a first priority have overlapping time or frequency resources with other uplink transmissions of a second priority, based on a collision resolution configuration. The collision resolution configuration may be preconfigured at a transmitting device such as a user equipment (UE) or indicated to the UE from a network node such as a base station. In some examples, the collision resolution configuration may indicate how the UE is to handle collisions between periodic high priority uplink transmissions (e.g., uplink control channel transmissions configured according to a semi-persistent scheduling (SPS) configuration) and lower priority uplink transmissions, which may be configured uplink transmissions or dynamically granted uplink transmissions.

31 Claims, 19 Drawing Sheets

(56) References Cited

OTHER PUBLICATIONS

Ericsson: "Scope Adjustment of IIoT Work Item", 3GPP Draft, 3GPP TSG RAN Meeting #84, RP-191389 Scope Adjustment of IIOT Work Item, 3rd Generation Partnership Project (3GPP), Mobile Competence Centre, 650, Route Des Lucioles, F-06921 Sophia-Antipolis Cedex, France, vol. TSG RAN, No. Newport Beach, USA, Jun. 3, 2019-Jun. 6, 2019 May 27, 2019 (May 27, 2019), XP051739724, pp. 1-6, Retrieved from the Internet: URL:http://www.3gpp.org/ftp/tsg%5Fran/TSG%5FRAN/TSGR%5F84/Docs/RP%2D191389%2Ezip section 2.1-section 2.2.
Ericsson: "Handling of De-Prioritized MAC PDUs", 3GPP Draft, 3GPP TSG-RAN WG2 #107, R2-1909375 (Revision of R2-1906850) Handling of De-Prioritized MAC PDUS, 3rd Generation Partnership Project (3GPP), Mobile Competence Centre, 650, Route Des Lucioles, F-06921 Sophia-Antipolis Cedex, France, vol. RAN WG2, No. Prague, Czech, Aug. 26, 2019-Aug. 30, 2019 Aug. 15, 2019 (Aug. 15, 2019), XP051767175, pp. 1-5, Retrieved from the Internet: URL:http://www.3gpp.org/ftp/tsg_ran/WG2_RL2/TSGR2_107/Docs/R2-1909375.zip [retrieved on Aug. 15, 2019] p. 2, figure.
Ericsson: "Main Functions of Intra-UE Data-Data Prioritization", 3GPP Draft, 3GPP TSG-RAN WG2 #107, R2-1909373 (Revision of R2-1906848) Main Functions of Intra-UE Data-Data Prioritization, 3rd Generation Partnership Project (3GPP), Mobile Competence Centre, 650, Route Des Lucioles, F-06921 Sophia-Antipolis Ced, vol. RAN WG2, No. Prague, Czech, Aug. 26, 2019-Aug. 30, 2019 Aug. 15, 2019 (Aug. 15, 2019), XP051767173, 4 Pages, Retrieved from the Internet: URL:http://www.3gpp.org/ftp/tsg_ran/WG2_RL2/TSGR2_107/Docs/R2-1909373.zip [retrieved on Aug. 15, 2019] section 2.1, figure 1.
International Search Report and Written Opinion—PCT/US2021/017793—ISA/EPO—dated Jun. 1, 2021 (201542WO).
Nokia, et al., "Prioritization between Dynamic Grant and Configured Grant", 3GPP Draft, 3GPP TSG-RAN WG2 NR Ad hoc 1801, R2-1800586 Prioritization between Dynamic Grant and Configured Grant, 3rd Generation Partnership Project (3GPP), Mobile Competence Centre, 650, Route Des Lucioles, F-06921 Sophia-Antipol, vol. RAN WG2, No. Vancouver, Canada, Jan. 22, 2018-Jan. 26, 2018, Jan. 12, 2018 (Jan. 12, 2018), XP051386236, 3 Pages, Retrieved from the Internet: URL:http://www.3gpp.org/ftp/tsg%5Fran/WG2%5FRL2/TSGR2%5FAHs/2018%5F01%5FNR/Docs/ [retrieved on Jan. 12, 2018] Proposal 1.
Samsung: "Remaining Issue on SPS/Grant-Free: How to Handle Dynamic Grant Coinciding with Configured Grant", 3GPP Draft, 3GPP TSG RAN WG2 NR Ad-hoc 0118, Tdoc R2-1801371, 3rd Generation Partnership Project (3GPP), Mobile Competence Centre, 650, Route Des Lucioles, F-06921 Sophia-Antipolis Cedex, France vol. RAN WG2, No. Vancouver, Canada, Jan. 22, 2018-Jan. 26, 2018 Jan. 12, 2018 (Jan. 12, 2018), XP051386781, 4 Pages, Retrieved from the Internet: URL:http://www.3gpp.org/ftp/tsg%5Fran/WG2%5FRL2/TSGR2%5FAHs/2018%5F01%5FNR/Docs/ [retrieved on Jan. 12, 2018] p. 2, Case 1.

\* cited by examiner

UPLINK CHANNEL PRIORITIZATION FOR PERIODIC HIGH PRIORITY UPLINK COMMUNICATIONS

CROSS REFERENCE

The present Application for Patent claims the benefit of U.S. Provisional Patent Application No. 62/976,943 by HOSSEINI et al., entitled "UPLINK CHANNEL PRIORITIZATION FOR PERIODIC HIGH PRIORITY UPLINK COMMUNICATIONS," filed Feb. 14, 2020, assigned to the assignee hereof, and expressly incorporated by reference herein.

FIELD OF TECHNOLOGY

The following relates generally to wireless communications and more specifically to uplink channel prioritization for periodic high priority uplink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support uplink channel prioritization for periodic high priority uplink communications (e.g., uplink communications based on a configured grant). Various aspects of the disclosure provide for prioritization of uplink transmissions in the event that periodic uplink transmissions of a first priority have overlapping time or frequency resources with other uplink transmissions of a second priority, based on a collision resolution configuration. The collision resolution configuration may be preconfigured at a transmitting device (e.g., a user equipment (UE)) or indicated to the transmitting device from a network node (e.g., a base station). In some examples, the collision resolution configuration may indicate how the UE is to handle collisions between periodic high priority uplink transmissions (e.g., uplink control channel transmissions configured according to a semi-persistent scheduling (SPS) configuration) and lower priority uplink transmissions, which may be configured uplink transmissions or dynamically granted uplink transmissions.

In some cases, if a periodic high priority uplink transmission overlaps with a lower priority uplink transmission, the lower priority uplink transmission may be cancelled starting at the first overlapping symbol. In some cases, a UE that receives a low priority grant having resources that overlap with periodic high priority transmission resources may treat the low priority grant as an error case (e.g., and ignore the low priority grant). In further cases, a dynamic low priority grant with resources that overlap periodic high priority transmission resources may be considered to override the periodic high priority grant, and the high priority transmission may be dropped. In some cases, the periodic high priority transmissions may be SPS resources configured for acknowledgment feedback (e.g., hybrid automatic receipt request (HARQ) feedback) or high priority scheduling request (SR) resources. The lower priority transmission resources may include dynamically granted lower priority shared channel or control channel resources, SPS resources for lower priority transmissions, SR resources for lower priority SRs, periodic or semi-persistent channel state information resources, or any combinations thereof.

A method of wireless communication at a UE is described. The method may include determining that a first configured uplink resource of a set of configured uplink resources for uplink communications of a first priority at least partially overlaps in time with a second uplink resource for uplink communications of a second priority that is lower than the first priority, cancelling, based on the determining, at least a portion of a second uplink communication before a first symbol of the second uplink resource that overlaps with a first symbol of the first configured uplink resource, and transmitting a first uplink communication of the first priority via the first configured uplink resource.

An apparatus for wireless communication at a UE is described. The apparatus may include a processor, memory coupled with the processor, and instructions stored in the memory. The instructions may be executable by the processor to cause the apparatus to determine that a first configured uplink resource of a set of configured uplink resources for uplink communications of a first priority at least partially overlaps in time with a second uplink resource for uplink communications of a second priority that is lower than the first priority, cancel, based on the determining, at least a portion of a second uplink communication before s first symbol of the second uplink resource that overlaps with a first symbol of the first configured uplink resource, and transmit a first uplink communication of the first priority via the first configured uplink resource.

Another apparatus for wireless communication at a UE is described. The apparatus may include means for determining that a first configured uplink resource of a set of configured uplink resources for uplink communications of a first priority at least partially overlaps in time with a second uplink resource for uplink communications of a second priority that is lower than the first priority, cancelling, based on the determining, at least a portion of a second uplink communication starting before or at a first symbol of the second uplink resource that overlaps with a first symbol of the first configured uplink resource, and transmitting a first uplink communication of the first priority via the first configured uplink resource.

A non-transitory computer-readable medium storing code for wireless communication at a UE is described. The code may include instructions executable by a processor to determine that a first configured uplink resource of a set of configured uplink resources for uplink communications of a first priority at least partially overlaps in time with a second uplink resource for uplink communications of a second priority that is lower than the first priority, cancel, based on the determining, at least a portion of a second uplink communication before a first symbol of the second uplink resource that overlaps with a first symbol of the first configured uplink resource, and transmit a first uplink communication of the first priority via the first configured uplink resource.

In some examples of the method, apparatuses, and non-transitory computer-readable medium described herein, the set of configured uplink resources for uplink communications of the first priority include semi-persistent scheduled (SPS) resources for transmission of the uplink communications of the first priority, scheduling request resources, semi-persistent channel state information report resources, or physical uplink control channel resources, and where the second uplink communication of the second priority is a dynamically granted uplink communication. In some examples of the method, apparatuses, and non-transitory computer-readable medium described herein, the uplink communications of the first priority include high priority (HP) acknowledgment feedback for one or more downlink transmissions, or a HP scheduling request (SR) transmission to a base station.

In some examples of the method, apparatuses, and non-transitory computer-readable medium described herein, the dynamically granted uplink communication of the second priority may be for a physical uplink shared channel transmission or a physical uplink control channel transmission carrying acknowledgment feedback information of the second priority. In some examples of the method, apparatuses, and non-transitory computer-readable medium described herein, the set of configured uplink resources for uplink communications of the first priority include semi-persistent scheduled (SPS) resources for transmission of acknowledgment feedback or scheduling requests, and where the second uplink resource for uplink communications of the second priority is a semi-persistent uplink resource for uplink communications of the second priority. In some examples of the method, apparatuses, and non-transitory computer-readable medium described herein, the semi-persistent uplink resource is for transmission of one or more of a lower priority scheduling request, a lower priority channel state information transmission, lower priority acknowledgment feedback, or any combinations thereof.

A method of wireless communication at a UE is described. The method may include identifying a set of periodic uplink resources for uplink communications of a first priority from the UE to a base station, determining that a first periodic uplink resource of the set of periodic uplink resources at least partially overlaps with a second uplink resource of a second uplink communication of a second priority that is lower than the first priority, cancelling, based on the determining, a first uplink communication of the first priority, and transmitting the second uplink communication via the second uplink resource.

An apparatus for wireless communication at a UE is described. The apparatus may include a processor, memory coupled with the processor, and instructions stored in the memory. The instructions may be executable by the processor to cause the apparatus to identify a set of periodic uplink resources for uplink communications of a first priority from the UE to a base station, determine that a first periodic uplink resource of the set of periodic uplink resources at least partially overlaps with a second uplink resource of a second uplink communication of a second priority that is lower than the first priority, cancel, based on the determining, a first uplink communication of the first priority, and transmit the second uplink communication via the second uplink resource.

Another apparatus for wireless communication at a UE is described. The apparatus may include means for identifying a set of periodic uplink resources for uplink communications of a first priority from the UE to a base station, determining that a first periodic uplink resource of the set of periodic uplink resources at least partially overlaps with a second uplink resource of a second uplink communication of a second priority that is lower than the first priority, cancelling, based on the determining, a first uplink communication of the first priority, and transmitting the second uplink communication via the second uplink resource.

A non-transitory computer-readable medium storing code for wireless communication at a UE is described. The code may include instructions executable by a processor to identify a set of periodic uplink resources for uplink communications of a first priority from the UE to a base station, determine that a first periodic uplink resource of the set of periodic uplink resources at least partially overlaps with a second uplink resource of a second uplink communication of a second priority that is lower than the first priority, cancel, based on the determining, a first uplink communication of the first priority, and transmit the second uplink communication via the second uplink resource.

In some examples of the method, apparatuses, and non-transitory computer-readable medium described herein, the set of periodic uplink resources for uplink communications of the first priority include semi-persistent scheduled (SPS) resources for transmission of the uplink communications of the first priority, and where the second uplink resource is a dynamically granted uplink resource. In some examples of the method, apparatuses, and non-transitory computer-readable medium described herein, the uplink communications of the first priority include high priority (HP) acknowledgment feedback for one or more HP downlink communications, or scheduling request (SR) resources for transmission of a HP SR to the base station. Some examples of the method, apparatuses, and non-transitory computer-readable medium described herein may further include operations, features, means, or instructions for determining, prior to the cancelling, that the acknowledgment feedback for the one or more HP downlink communications includes all negative acknowledgments (NACKs), and where the cancelling is performed responsive to the acknowledgment feedback including all NACKs.

In some examples of the method, apparatuses, and non-transitory computer-readable medium described herein, the determining further may include operations, features, means, or instructions for receiving an uplink grant for the dynamically granted uplink resource at or prior to a threshold number of symbols before an earliest symbol of the SPS resource of the first uplink communication of the first priority. In some examples of the method, apparatuses, and non-transitory computer-readable medium described herein, the uplink grant for the dynamically granted uplink resource is ignored when received after the threshold number of symbols before the earliest symbol of the SPS resource of the first uplink communication of the first priority.

In some examples of the method, apparatuses, and non-transitory computer-readable medium described herein, the uplink communications of the first priority include high priority (HP) acknowledgment feedback for one or more HP downlink communications, and where the method further includes, and determining, prior to the cancelling, that the acknowledgment feedback for the one or more HP downlink communications includes all positive acknowledgments (ACKs), and where the cancelling is performed responsive to the acknowledgment feedback for the one or more HP downlink communications including all ACKs.

Some examples of the method, apparatuses, and non-transitory computer-readable medium described herein may further include operations, features, means, or instructions for determining, after the transmitting, that a second periodic uplink resource of the set of periodic uplink resources at least partially overlaps with a third uplink resource of a second uplink communication of the second priority, determining that acknowledgment feedback to be transmitted in a second uplink communication of the first priority includes at least one negative acknowledgment (NACK), cancelling, based on the second uplink communication of the first priority including the at least one NACK, at least a portion of the second uplink communication of the second priority, and transmitting the second uplink communication of the first priority via the second periodic uplink resource. In some examples of the method, apparatuses, and non-transitory computer-readable medium described herein, the second uplink communication of the second priority is cancelled starting at a first overlapping symbol of the second periodic uplink resource and the third uplink resource.

A method of wireless communication at a UE is described. The method may include receiving, from a base station, configuration information for a plurality of configured uplink resources for uplink communications of a first priority from the UE to the base station, where an uplink grant from the base station for an uplink communication of a second priority that is lower than the first priority is expected only to use uplink resources that are non-overlapping with a first configured uplink resource of the set of configured uplink resources, receiving, from the base station, a first uplink grant for a first uplink communication with a second priority that is higher than the first priority, the first uplink grant indicating first uplink resources that at least partially overlap with the first configured uplink resource; and transmitting the first uplink communication using the first uplink resources.

An apparatus for wireless communication at a UE is described. The apparatus may include a processor, memory coupled with the processor, and instructions stored in the memory. The instructions may be executable by the processor to cause the apparatus to receive, from a base station, configuration information for a set of configured uplink resources for uplink communications of a first priority from the UE to the base station, where an uplink grant from the base station for an uplink communication of a second priority that is lower than the first priority is expected only to use uplink resources that are non-overlapping with a first configured uplink resource of the set of configured uplink resources, receive, from the base station, a first uplink grant for a first uplink communication with a second priority that is higher than the first priority, the first uplink grant indicating first uplink resources that at least partially overlap with the first configured uplink resource; and transmit the first uplink communication using the first uplink resources.

Another apparatus for wireless communication at a UE is described. The apparatus may include means for receiving, from a base station, configuration information for a set of configured uplink resources for uplink communications of a first priority from the UE to the base station, where an uplink grant from the base station for an uplink communication of a second priority that is lower than the first priority is expected only to use uplink resources that are non-overlapping with a first configured uplink resources, receiving, from the base station, a first uplink grant for a first uplink communication with a second priority that is higher than the first priority, the first uplink grant indicating first uplink resources that at least partially overlap with the first configured uplink resource; and transmitting the first uplink communication using the first uplink resources.

A non-transitory computer-readable medium storing code for wireless communication at a UE is described. The code may include instructions executable by a processor to receive, from a base station, configuration information for a set of configured uplink resources for uplink communications of a first priority from the UE to the base station, where an uplink grant from the base station for an uplink communication of a second priority that is lower than the first priority is expected only to use uplink resources that are non-overlapping with a first configured uplink resource of the set of configured uplink resources, receive, from the base station, a first uplink grant for a first uplink communication with a second priority that is higher than the first priority, the first uplink grant indicating first uplink resources that at least partially overlap with the first configured uplink resource; and transmit the first uplink communication using the first uplink resources.

In some examples of the method, apparatuses, and non-transitory computer-readable medium described herein, the UE is not expected to be scheduled with a physical uplink control channel (PUCCH) of a lower priority carrying acknowledgment feedback information in response to a physical downlink shared channel (PDSCH) without a corresponding PDCCH overlapping with a PUCCH transmission or a PUSCH transmission of a higher priority. In some examples of the method, apparatuses, and non-transitory computer-readable medium described herein, the set of periodic uplink resources for uplink communications of the first priority include semi-persistent scheduled (SPS) resources for transmission of the uplink communications of the first priority, and where the uplink communication of the second priority is a dynamically granted uplink communication of the second priority. In some examples of the method, apparatuses, and non-transitory computer-readable medium described herein, the uplink communications of the first priority include high priority (HP) acknowledgment feedback for one or more HP downlink transmissions, or a HP scheduling request (SR) transmission to the base station.

In some examples of the method, apparatuses, and non-transitory computer-readable medium described herein, the dynamically granted uplink communication of the second priority is for a lower priority physical uplink shared channel transmission or a lower priority physical uplink control channel transmission carrying acknowledgment feedback information. In some examples of the method, apparatuses, and non-transitory computer-readable medium described herein, the set of configured uplink resources for uplink communications of the first priority include semi-persistent scheduled (SPS) resources for transmission of acknowledgment feedback or scheduling requests, and where the uplink grant for the uplink communication of the second priority is part of a configured uplink grant for uplink communications of the second priority. In some examples of the method, apparatuses, and non-transitory computer-readable medium described herein, the configured uplink grant is for transmission of one or more of a lower priority scheduling request, a lower priority channel state information transmission, lower priority acknowledgment feedback, or any combinations thereof.

A method of wireless communication at a base station is described. The method may include configuring a set of configured uplink resources for uplink communications of a first priority from a UE to the base station, determining that a first configured uplink resource of the set of configured uplink resources at least partially overlaps with a second uplink resource of a second uplink communication of a second priority that is lower than the first priority, cancelling, based on the determining, at least a portion of the second uplink communication starting before or at a first symbol of the second uplink resource that overlaps with a first symbol of the first configured uplink resource, and receiving a first uplink communication of the first priority via the first configured uplink resource.

An apparatus for wireless communication at a base station is described. The apparatus may include a processor, memory coupled with the processor, and instructions stored in the memory. The instructions may be executable by the processor to cause the apparatus to configure a set of configured uplink resources for uplink communications of a first priority from a UE to the base station, determine that a first configured uplink resource of the set of configured uplink resources at least partially overlaps with a second uplink resource of a second uplink communication of a second priority that is lower than the first priority, cancel, based on the determining, at least a portion of the second uplink communication starting before or at a first symbol of the second uplink resource that overlaps with a first symbol of the first configured uplink resource, and receive a first uplink communication of the first priority via the first configured uplink resource.

Another apparatus for wireless communication at a base station is described. The apparatus may include means for configuring a set of configured uplink resources for uplink communications of a first priority from a UE to the base station, determining that a first configured uplink resource of the set of configured uplink resources at least partially overlaps with a second uplink resource of a second uplink communication of a second priority that is lower than the first priority, cancelling, based on the determining, at least a portion of the second uplink communication starting before or at a first symbol of the second uplink resource that overlaps with a first symbol of the first configured uplink resource, and receiving a first uplink communication of the first priority via the first configured uplink resource.

A non-transitory computer-readable medium storing code for wireless communication at a base station is described. The code may include instructions executable by a processor to configure a set of configured uplink resources for uplink communications of a first priority from a UE to the base station, determine that a first configured uplink resource of the set of configured uplink resources at least partially overlaps with a second uplink resource of a second uplink communication of a second priority that is lower than the first priority, cancel, based on the determining, at least a portion of the second uplink communication starting before or at a first symbol of the second uplink resource that overlaps with a first symbol of the first configured uplink resource, and receive a first uplink communication of the first priority via the first configured uplink resource.

In some examples of the method, apparatuses, and non-transitory computer-readable medium described herein, the set of configured uplink resources for uplink communications of the first priority include semi-persistent scheduled (SPS) resources for transmission of the uplink communications of the first priority, and where the second uplink communication is a dynamically granted uplink communication of the second priority. In some examples of the method, apparatuses, and non-transitory computer-readable medium described herein, the uplink communications of the first priority include high priority (HP) acknowledgment feedback for one or more HP downlink transmissions, or a HP scheduling request (SR) transmission of the UE. In some examples of the method, apparatuses, and non-transitory computer-readable medium described herein, the dynamically granted uplink communication of the second priority is for a lower priority physical uplink shared channel transmission or a lower priority physical uplink control channel transmission carrying acknowledgment feedback information.

In some examples of the method, apparatuses, and non-transitory computer-readable medium described herein, the set of configured uplink resources for uplink communications of the first priority include semi-persistent scheduled (SPS) resources for transmission of acknowledgment feedback or scheduling requests, and where the second uplink resource is a configured uplink resource for uplink communications of the second priority. In some examples of the method, apparatuses, and non-transitory computer-readable medium described herein, the configured uplink resource is for transmission of one or more of a lower priority scheduling request, a lower priority channel state information transmission, lower priority acknowledgment feedback, or any combinations thereof.

A method of wireless communication at a base station is described. The method may include configuring a set of configured uplink resources for uplink communications of a first priority from a UE to the base station, determining that a first configured uplink resource of the set of configured uplink resources at least partially overlaps with a second uplink resource of a second uplink communication of a second priority that is lower than the first priority, cancelling, based on the determining, a first uplink communication of the first priority, and receiving the second uplink communication of the second priority via the second uplink resource.

An apparatus for wireless communication at a base station is described. The apparatus may include a processor, memory coupled with the processor, and instructions stored in the memory. The instructions may be executable by the processor to cause the apparatus to configure a set of configured uplink resources for uplink communications of a first priority from a UE to the base station, determine that a first configured uplink resource of the set of configured uplink resources at least partially overlaps with a second uplink resource of a second uplink communication of a second priority that is lower than the first priority, cancel, based on the determining, a first uplink communication of the first priority, and receive the second uplink communication of the second priority via the second uplink resource.

Another apparatus for wireless communication at a base station is described. The apparatus may include means for configuring a set of configured uplink resources for uplink communications of a first priority from a UE to the base station, determining that a first configured uplink resource of the set of configured uplink resources at least partially overlaps with a second uplink resource of a second uplink communication of a second priority that is lower than the first priority, cancelling, based on the determining, a first uplink communication of the first priority, and receiving the second uplink communication of the second priority via the second uplink resource.

A non-transitory computer-readable medium storing code for wireless communication at a base station is described.

The code may include instructions executable by a processor to configure a set of configured uplink resources for uplink communications of a first priority from a UE to the base station, determine that a first configured uplink resource of the set of configured uplink resources at least partially overlaps with a second uplink resource of a second uplink communication of a second priority that is lower than the first priority, cancel, based on the determining, a first uplink communication of the first priority, and receive the second uplink communication of the second priority via the second uplink resource.

In some examples of the method, apparatuses, and non-transitory computer-readable medium described herein, the set of configured uplink resources for uplink communications of the first priority include semi-persistent scheduled (SPS) resources for transmission of the uplink communications of the first priority, and where the second uplink resource for the second communication of the second priority is a dynamically granted uplink resource. In some examples of the method, apparatuses, and non-transitory computer-readable medium described herein, the uplink communications of the first priority include high priority (HP) acknowledgment feedback for one or more HP downlink communications, or scheduling request (SR) resources for transmission of a HP SR to the base station. Some examples of the method, apparatuses, and non-transitory computer-readable medium described herein may further include operations, features, means, or instructions for determining to grant the second uplink resource for the second uplink communication to the UE, and determining, responsive to the determining to grant the second uplink resource, to skip one or more of the HP downlink communications to the UE that are to have acknowledgment feedback provided in the first configured uplink resource.

Some examples of the method, apparatuses, and non-transitory computer-readable medium described herein may further include operations, features, means, or instructions for transmitting an uplink grant for the dynamically granted uplink resource to the UE at or prior to a threshold number of symbols before an earliest symbol of the SPS resource of the first uplink communication of the first priority. In some examples of the method, apparatuses, and non-transitory computer-readable medium described herein, the uplink communications of the first priority include high priority (HP) acknowledgment feedback for one or more HP downlink communications, and where the method further includes, and determining, based on receiving the second uplink communication from the UE, that the acknowledgment feedback for the one or more HP downlink communications includes all positive acknowledgments (ACKs).

DETAILED DESCRIPTION

Figure 1:
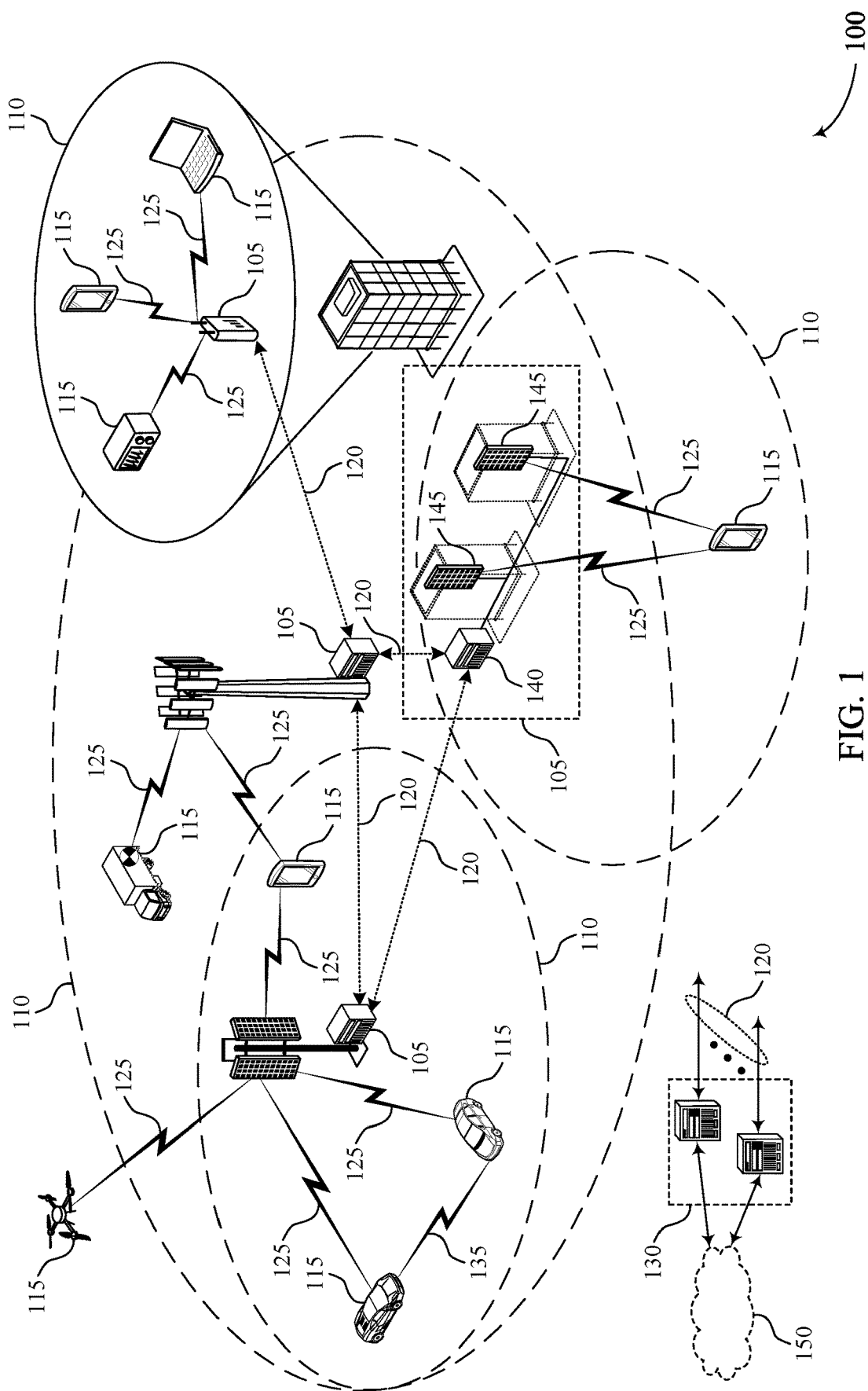
FIG. 1 illustrates an example of a system for wireless communications that supports uplink channel prioritization for periodic high priority uplink communications in accordance with aspects of the present disclosure.

Some transmissions on wireless channels (e.g., physical uplink control channel (PUCCH) or physical uplink shared channel (PUSCH) transmissions, or both) may collide with one another when the resources utilized for each channel overlap. For example, feedback information such as hybrid automatic repeat request (HARQ) acknowledgement (ACK) feedback may be transmitted via an uplink control channel (e.g., a single slot PUCCH) that may overlap with a shared data channel transmission (e.g., a PUSCH transmission). While multiplexing techniques and scheduling may mitigate some of the collisions, these techniques may introduce latency and decrease reliability of the transmissions, which may be problematic for high priority or low latency transmissions. For example, some techniques may result in the cancellation of a lower priority transmission starting a certain number of symbols after a control channel transmission that includes the higher priority grant (e.g., N symbols after the end of a control channel transmission scheduling the high priority transmission), where N is based on a capability of the UE). Such techniques may result in unnecessary cancellations of some lower priority transmissions, and may also reduce flexibility of a base station in scheduling lower priority resources. Further, in cases where the high priority grant is a semi-persistent scheduling (SPS) grant, existing techniques may be ambiguous with respect to when a transmission is to be dropped.

Various aspects of the disclosure provide for prioritization of uplink transmissions in the event that periodic uplink transmissions (e.g., that are provided in a configured grant) of a first priority have overlapping time or frequency resources with other uplink transmissions of a second priority, which may reduce latency, enhance reliability, and increase flexibility in scheduling of transmissions. Exemplary techniques are provided for UE handling of collisions between periodic high priority uplink transmissions (e.g., uplink control channel transmissions configured according to a semi-persistent scheduling (SPS) configuration) and lower priority uplink transmissions, which may be configured uplink transmissions or dynamically granted uplink transmissions. In some cases, if a periodic high priority uplink transmission overlaps with a lower priority uplink transmission, the lower priority uplink transmission may be cancelled starting at the first overlapping symbol. In some cases, a UE that receives a low priority grant having resources that overlap with periodic high priority transmission resources may treat the low priority grant as an error case and may ignore the low priority grant. In further cases, a dynamic lower priority grant with resources that overlap periodic high priority transmission resources may be considered to override the periodic high priority grant, and the high priority transmission may be dropped. In some cases, one or more rules for dropping the high priority or lower priority grant may be used to determine which transmissions are dropped (e.g., a high priority HARQ ACK communication may be dropped if it contains all ACKs or all NACKs). Such techniques may be useful to reduce an amount of unnecessary cancellations of some lower priority transmissions, and may also enhance flexibility of a base station in scheduling lower priority resources, and thereby provide enhanced network efficiency and reliability.

In some cases, the periodic or configured high priority transmissions may be SPS resources configured for acknowledgment feedback (e.g., HARQ feedback) or high priority scheduling request (SR) resources. The lower priority transmission resources may include dynamically granted lower priority shared channel or control channel resources, SPS resources for lower priority transmissions, SR resources for lower priority SRs, periodic or semi-persistent channel state information resources, or any combinations thereof.

Aspects of the disclosure are initially described in the context of wireless communications systems. Aspects are also described with respect to example timelines and process flows. Aspects of the disclosure are further illustrated by and described with reference to apparatus diagrams, system diagrams, and flowcharts that relate to uplink channel prioritization for periodic high priority uplink communications.

FIG. 1 illustrates an example of a wireless communications system 100 that supports uplink channel prioritization for periodic high priority uplink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, UEs 115 and base stations 105 may have communications that include a number of different priorities. In such cases, UEs 115 and base stations 105 may provide for prioritization of uplink transmissions in the event that periodic uplink transmissions of a higher first priority have overlapping time or frequency resources with other uplink transmissions of a lower second priority. Various techniques are provided in accordance with aspects of the present disclosure for UE 115 handling of collisions between periodic high priority uplink transmissions (e.g., PUCCH transmissions configured according to a SPS configuration) and lower priority uplink transmissions (e.g., dynamically configured lower priority transmissions). In some cases, if a periodic high priority uplink transmission overlaps with a lower priority uplink transmission, the lower priority uplink transmission may be cancelled starting at the first overlapping symbol. In some cases, a UE 115 that receives a low priority grant having resources that overlap with periodic high priority transmission resources may treat the low priority grant as an error case and ignore the low priority grant. In further cases, a dynamic lower priority grant with resources that overlap periodic high priority transmission resources may be considered to override the periodic high priority grant, and the high priority transmission may be dropped. In some cases, one or more rules for dropping the high priority or lower priority grant may be used to determine which transmissions are dropped (e.g., a high priority HARQ ACK communication may be dropped if it contains all ACKs or all NACKs).

Figure 2:
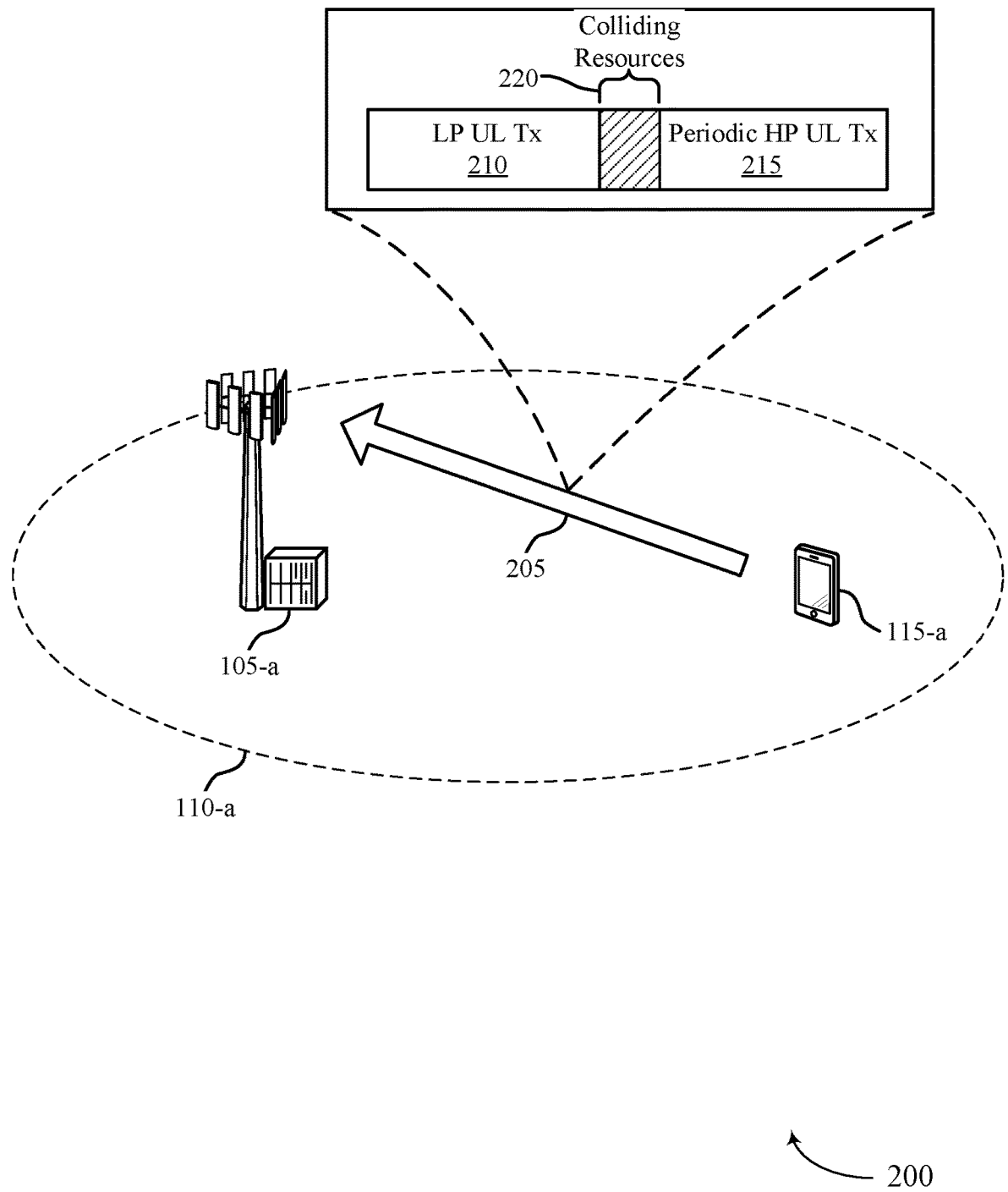
FIG. 2 illustrates an example of a portion of a wireless communications system that supports uplink channel prioritization for periodic high priority uplink communications in accordance with aspects of the present disclosure.

FIG. 2 illustrates an example of a wireless communications system 200 that supports uplink channel prioritization for periodic high priority uplink communications in accordance with aspects of the present disclosure. In some examples, wireless communications system 200 may implement aspects of wireless communications system 100. For instance, wireless communications system may include UE 115-a and base station 105-a, which may be examples of a UE 115 and a base station 105, respectively, as described with reference to FIG. 1.

Base station 105-a may transmit downlink and uplink grants to UE 115-a which may schedule one or more transmissions for UE 115-a. For instance, if base station 105-a transmits a downlink grant, UE 115-a may determine resources for receiving a PDSCH transmission from the downlink grant and if base station 105-a transmits an uplink grant, UE 115-a may determine resources for transmitting a PUSCH transmission from the uplink grant. The indication of downlink and uplink grants may be included within DCI (e.g., a downlink grant may be indicated via downlink DCI and an uplink grant may be indicated via uplink DCI).

In some cases, the base station 105-a may transmit a downlink grant or provide a configuration to the UE 115-a that results in granted resources for a lower priority uplink transmission 210. For example, the granted resources for the lower priority uplink transmission 210 may be provided in a dynamic downlink grant (e.g., in DCI of a PDCCH transmission) that grants PUSCH resources or PUCCH resources for HARQ feedback associated with lower priority communications. In other cases, the granted resources for the lower priority uplink transmission 210 may be provided as configured resources, such as SR resources, periodic or semi-persistent CSI resources, or SPS resources for HARQ feedback associated with lower priority communications. In some cases, at least a portion of the granted resources for the lower priority uplink transmission 210 may overlap with periodic high priority uplink resources 215 (e.g., high priority SPS resources configured for HARQ feedback or high priority SR resources), where the overlapping resources are illustrated as colliding resources 220 in the example of FIG. 2.

In some cases, UE 115-a is not expected to be scheduled with a PUCCH of a lower priority (e.g., having an associated priority index value that is larger than one or more other priority index values) carrying the HARQ-ACK information in response to PDSCH without a corresponding PDCCH overlapping with a PUCCH or PUSCH of a higher priority (e.g., having a lower priority index value) on the same serving cell. In the event that the UE 115-a does receive such an allocation, it may be treated as an error case in which UE 115-a behavior is not defined (e.g., the UE 115-a can ignore the allocation, or transmit the PUCCH). In some cases, such scheduling information may be an error event only when the lower priority PUCCH/PUSCH are scheduled by a downlink control information (DCI) from the base station 105-a. In some cases, SR resources may be configured, and if the UE 115-a reports a capability of intra-UE prioritization and if, after resolving overlapping for PUCCH and/or PUSCH transmissions of a same priority index, the UE 115-a determines to transmit a first PUCCH of larger priority index carrying SR and a second PUCCH of a smaller priority index, and the transmission of the first PUCCH would overlap in time with the transmission of the second PUCCH, the UE 115-a may cancel the transmission of the second PUCCH starting from the first overlapping symbol at the latest.

Additionally or alternatively, if the UE 115-a reports a capability of intra-UE prioritization, and if the UE would transmit PUSCHs corresponding to a configured grant with a priority either not provided or set to zero in a configuration (e.g., in a configuredGrantConfig from the base station 105-a) or transmit PUSCHs scheduled by PDCCHs where the priority indicator field in the corresponding DCI is either not configured or set to zero, that are overlapping fully or partially in time with a PUCCH of a priority index 1 (i.e., a highest priority), if the UE 115-a is transmitting PUCCH conveying a SR, the UE 115-a may cancel the transmission of the PUSCHs starting from the first overlapping symbol at the latest.

Figure 3:
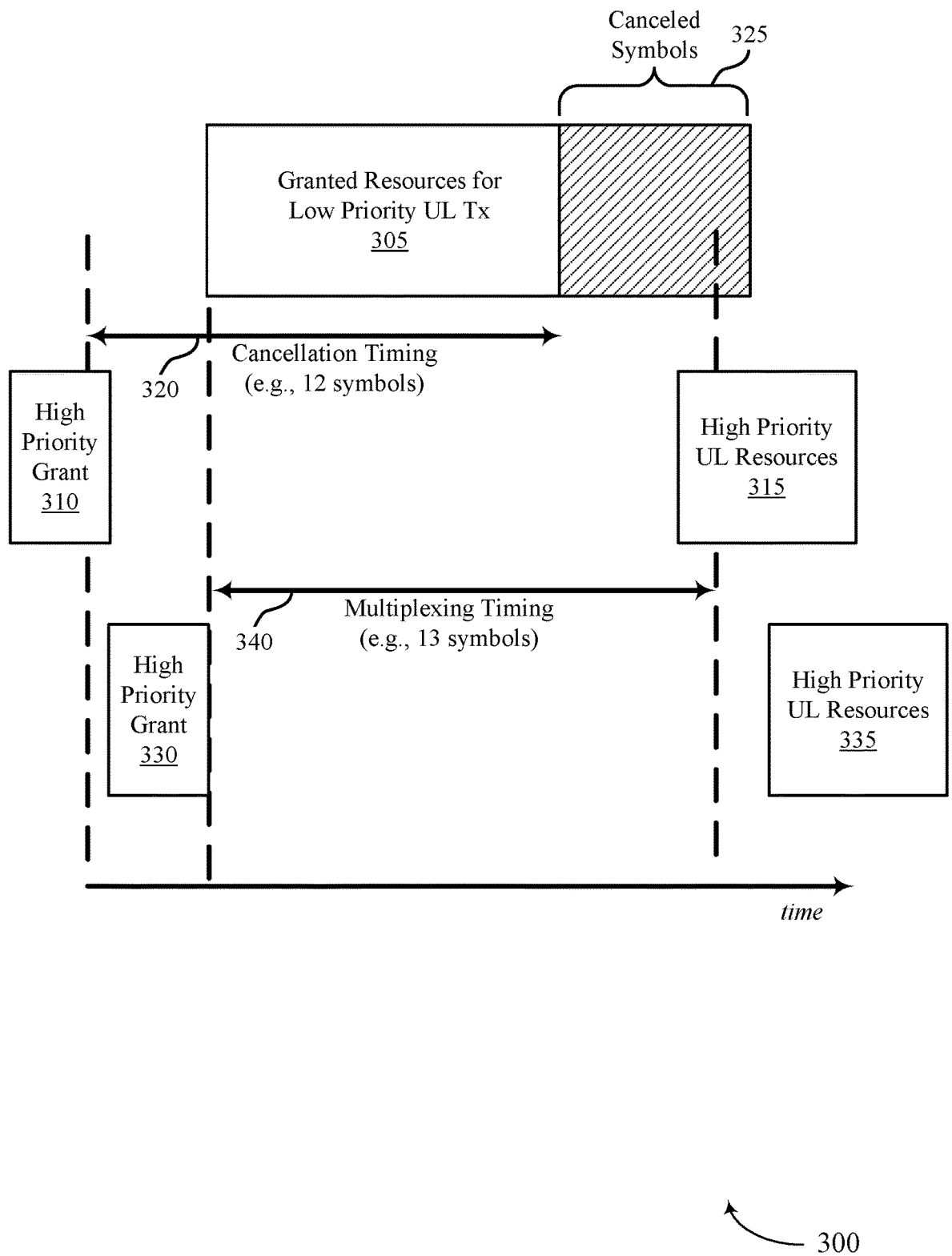
FIGS. 3 through 5 illustrate examples of a uplink resources that support uplink channel prioritization for high priority uplink communications in accordance with aspects of the present disclosure.

As indicated above, in some cases cancellation of lower priority uplink transmissions may be based on a timing of an uplink grant associated with higher priority uplink communications, an example of which is illustrated in FIG. 3.

FIG. 3 illustrates an example of a uplink resources 300 that support uplink channel prioritization for dynamically granted high priority uplink communications in accordance with aspects of the present disclosure. In some examples, uplink resources 300 may implement aspects of wireless communications system 100 or 200. In this example, a UE (e.g., a UE 115 of FIG. 1 or FIG. 2) may have lower priority granted resources 305 for a lower priority uplink transmission, and may receive a subsequent grant for a high priority uplink transmission.

In some cases, the UE may cancel or multiplex the high priority and low priority communications in accordance with one or more rules that are established for prioritization of communications. For example, a high priority grant 310 for high priority uplink resources 315 may be received in advance of a configured cancellation timing 320 at the UE. In some cases, the UE may cancel low priority transmissions for lower priority resources 325 starting at a first symbol after the cancellation timing 320. However, such a cancellation may result in one or more empty symbols before the start of the high priority uplink resources 315, which may be an inefficient use of resources.

Further, in some cases, the UE may be configured with a multiplexing timing 340 that may provide that lower priority transmissions may be multiplexed with a higher priority transmission in cases where the higher priority uplink resources 335 start after a defined number of symbols (e.g., 13 symbols, depending upon UE capability) after the associated high priority grant 330. However, in the event that the multiplexing timing 340 is prior to the end of the lower priority granted resources 305, this may result in cancellation of a portion of the lower priority transmission even though the associated high priority uplink resources 335 do not overlap with the lower priority granted resources 305, which may also be an inefficient use of resources, as the different priority transmissions could have been multiplexed. Further, as discussed herein, in some cases the high priority resources may be configured as periodic resources (e.g., based on a SPS PUCCH grant for HARQ feedback transmissions or configured periodic SR resources). In such cases, there may not be an explicit high priority grant, and the determination of cancellation of all or a portion of one of the overlapping transmissions may not be defined. Various aspects of the present disclosure provide techniques for dropping or multiplexing one or more transmissions in such cases.

Figure 4:
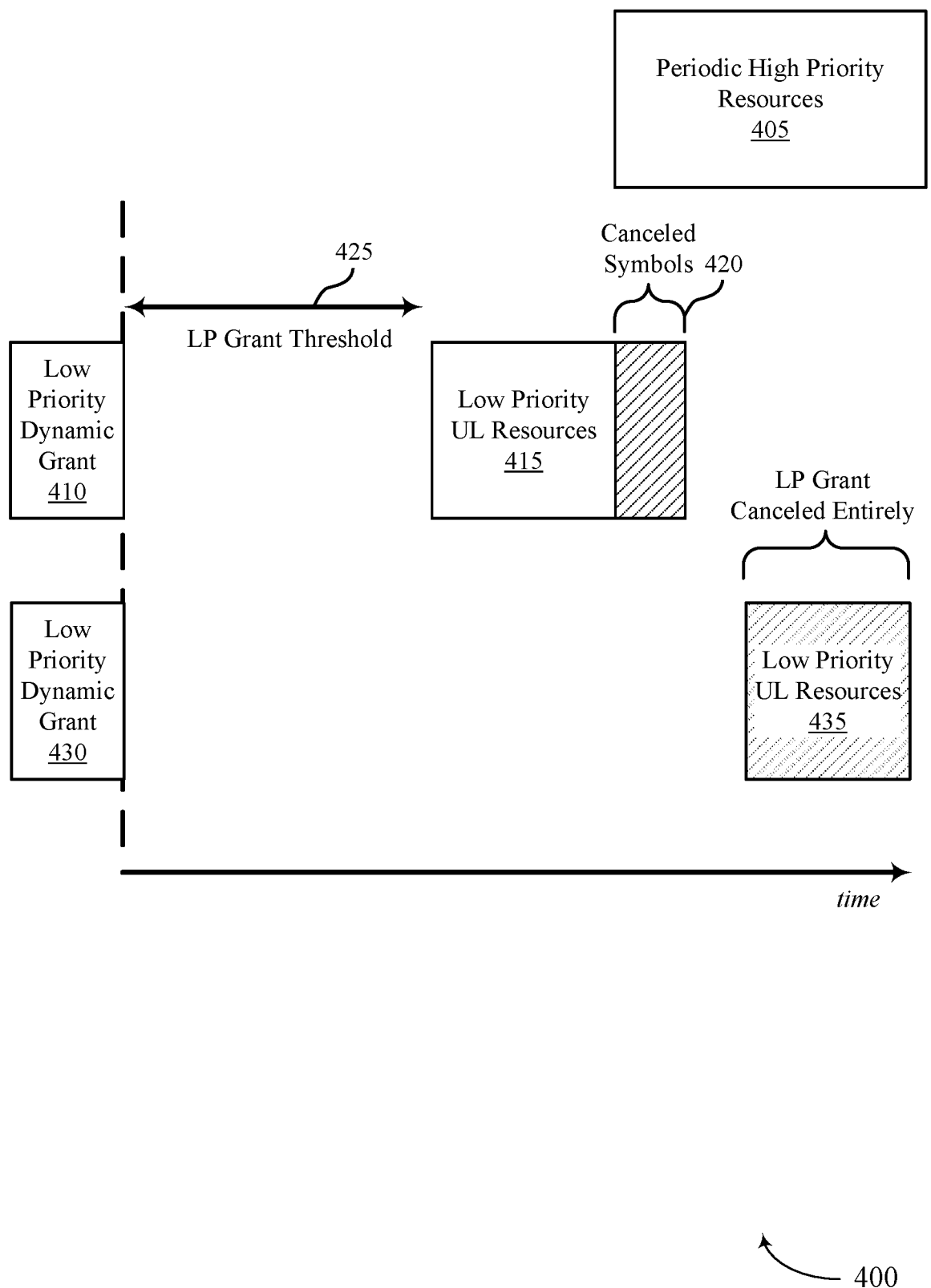

FIG. 4 illustrates an example of a uplink resources 400 that support uplink channel prioritization for periodic high priority uplink communications in accordance with aspects of the present disclosure. In some examples, uplink resources 400 may implement aspects of wireless communications system 100 or 200.

In this example, a UE (e.g., a UE 115 of FIG. 1 or FIG. 2) may be configured with periodic high priority resources 405. The periodic high priority resources 405 may be, for example, SPS resources that are configured for HARQ feedback from a HARQ codebook associated with high priority (e.g., URLLC) communications. In cases where the periodic high priority uplink resources 405 are SPS resources provided for HARQ feedback, in some cases, the UE may not expect to receive a lower priority grant that has overlapping uplink resources. In such cases, the UE may treat the lower priority grant as an error case, and may ignore the lower priority grant, and the high priority transmission of the UE may be transmitted in accordance with the SPS resources. In some cases, UE operation in an error case is not defined, and whether the UE ignores the grant or not is up to the UE. Base stations or other network nodes may perform scheduling to avoid such a scenario, in order to prevent such an error case.

In other cases, such as illustrated in FIG. 3, a cancellation rule may be configured (either configured by a base station, or a prespecified cancellation rule). In some cases, if a low priority dynamic grant 410 is received at the UE that indicates low priority uplink resources 415 that at least partially overlap with the periodic high priority resources 405, the UE may cancel a portion of the low priority transmissions starting at a first symbol of the overlapping symbols, as indicated as cancelled symbols 420 in FIG. 3. In such cases, the UE may still transmit a portion of the lower priority communications and cancellation does not start until a first overlapping symbol, thus providing enhanced resource usage for communications. In some cases, a low priority dynamic grant threshold 425 may be configured at the UE (e.g., as a number of symbols, such as N1 or N2 symbols) that identifies a timing before the start of the first symbol of a channel among the overlapping channels that starts earlier, where the DCI containing the low priority dynamic grant 410 should be before this threshold, in order to help avoid an interruption of an ongoing transmission. In some cases, a grant received after this threshold may be ignored by the UE.

In other cases, a low priority dynamic grant 430 may provide a grant of low priority uplink resources 435 that start after a first symbol of the periodic high priority uplink resources 405, and that may be completely or partially overlapped by the periodic high priority uplink resources 405. In such cases, the low priority resources may be cancelled entirely, and the uplink transmission associated with the periodic high priority uplink resources 405 may be transmitted.

Figure 5:
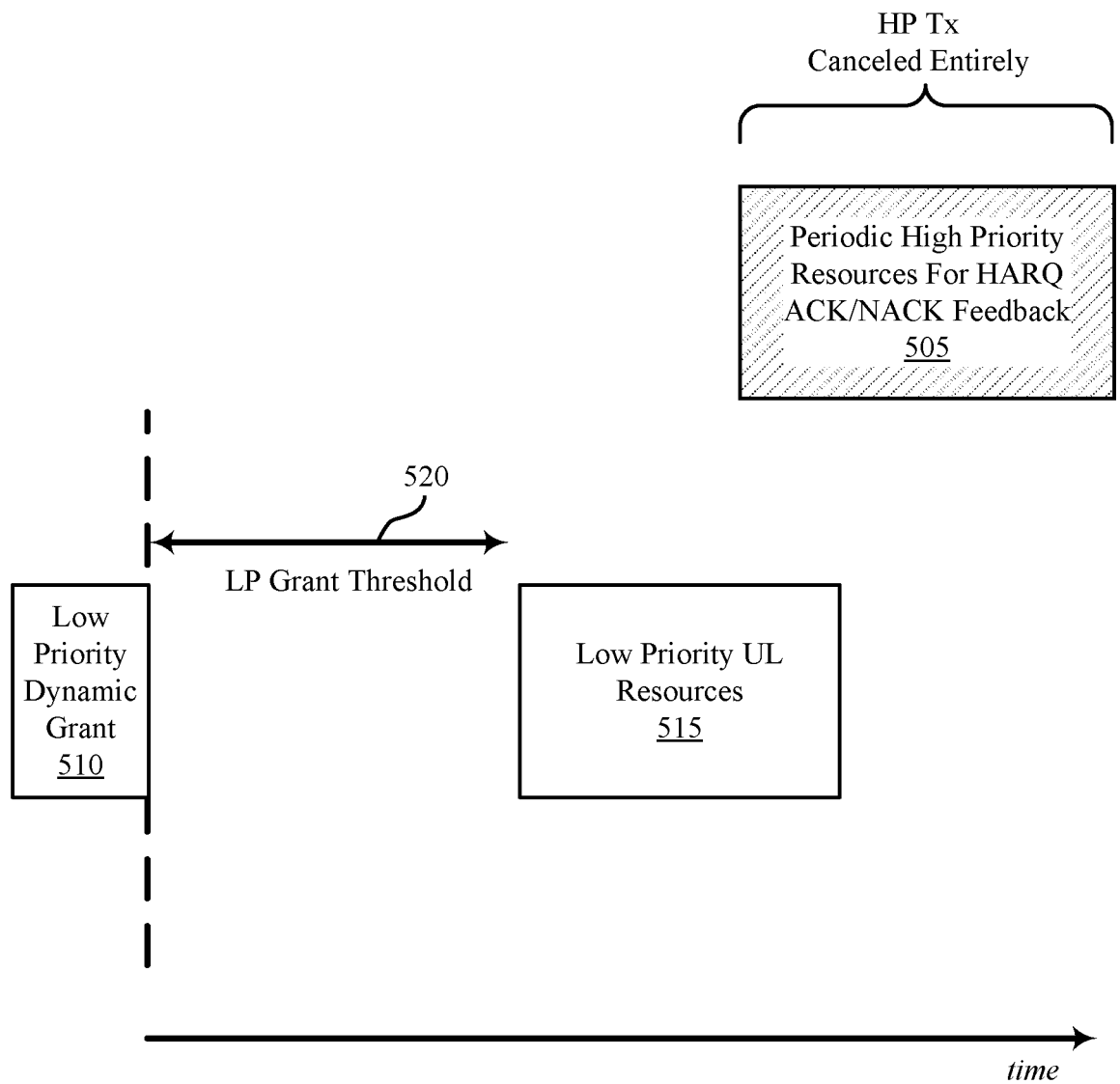

FIG. 5 illustrates an example of a uplink resources 500 that support uplink channel prioritization for periodic high priority uplink communications in accordance with aspects of the present disclosure. In some examples, uplink resources 500 may implement aspects of wireless communications system 100 or 200.

In this example, a UE (e.g., a UE 115 of FIG. 1 or FIG. 2) may be configured with periodic high priority resources 505. The periodic high priority resources 505 may be, for example, SPS resources that are configured for HARQ acknowledgment/negative-acknowledgment (ACK/NACK) feedback from a HARQ codebook associated with high priority (e.g., URLLC) communications. In some cases, in the event that the UE receives a low priority dynamic grant 510 that indicates low priority uplink resources 515 that at least partially overlap with the periodic high priority resources 505, the UE may cancel the high priority transmission and transmit the low priority transmission using the granted low priority uplink resources 515. Such techniques may provide additional scheduling flexibility for a serving base station. For example, the serving base station may not have transmitted any SPS PDSCH for which HARQ feedback is to be provided in the periodic high priority resources 505, and may want the UE to transmit the low priority channel instead and thereby reuse the resources. In some cases, the UE may drop the high priority PUCCH for SPS only if all HARQ feedback bits are NACKs (indicating that none of the associated PUSCH downlink transmissions were successfully decoded, which may be the result of the base station not transmitting the associated SPS PDSCH channel).

In some cases, the UE may be configured (e.g., configured by the serving base station, or preconfigured) with a low priority grant threshold 520 (e.g., a number of symbols such as N1 or N2 symbols) before the start of the first symbol of a channel among the overlapping channels that starts earlier, where the DCI containing the low priority dynamic grant 510 should be before this threshold, or otherwise be ignored by the UE. Such a low priority grant threshold 520 may help avoid an interruption of an ongoing transmission.

In other cases, the UE may drop the uplink transmission using the periodic high priority resources 505 if all of the HARQ feedback bits indicate ACK. In such a case, if the UE transmits the low priority channel, the serving base station may determine implicitly that all the SPS PDSCH transmissions have been decoded successfully by the UE. Otherwise, the UE may transmit the high priority PUCCH for SPS and drop all or a portion of the low priority dynamic grant channel (e.g., by cancelling an overlapping portion as discussed with reference to FIG. 4). Further the low priority grant threshold 520 may apply in such cases as well.

While the examples of FIGS. 4 and 5 are discussed with reference to periodic SPS high priority uplink resources, such as for HARQ feedback transmission, techniques as discussed herein may be used for other configured high priority uplink resources as well, such as SR resources for high priority channel SRs. In such cases, in the event of a low priority grant that overlaps with the SR resources, the low priority transmission may be dropped entirely or overlapping symbols of the low priority transmission may be dropped. In other cases, if at least one bit of the high priority SPS PUCCH with HARQ feedback is a NACK, the high priority communication may be transmitted, otherwise the low priority communication may be transmitted.

Further, while various examples of FIGS. 4 and 5 discuss HARQ feedback that is transmitted in high priority SPS PUCCH resources, such techniques may be applied to periodic SR resources as well. In such cases, if the high priority SR is positive, the low priority communication may be cancelled starting with the first overlapping symbol. In some cases, regardless of whether SR is positive or not, transmission over the resources overlapping with those of the high priority SR is not expected by the UE, and thus treated as an error case and ignored.

Figure 6:
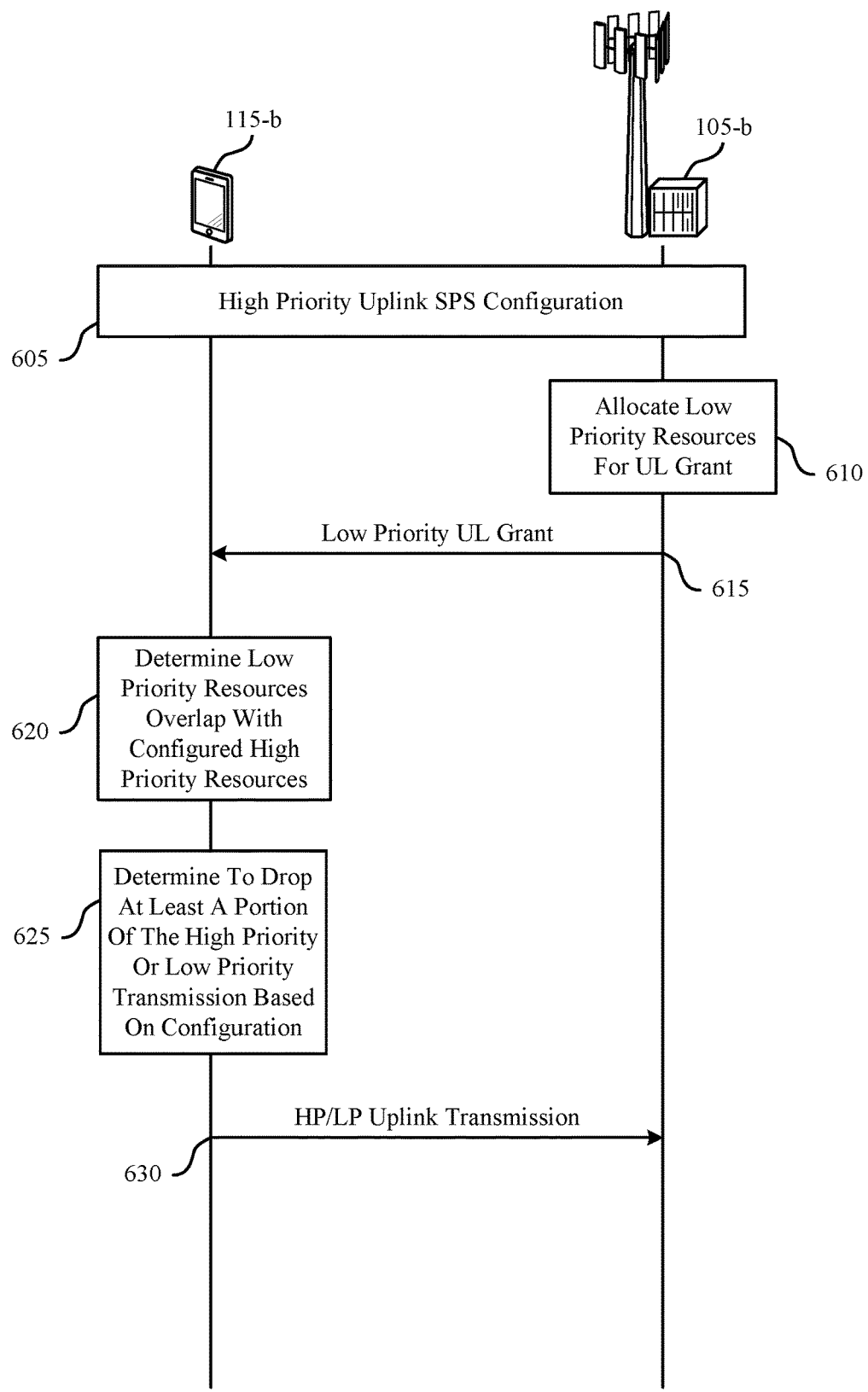
FIG. 6 illustrates an example of a process flow that supports uplink channel prioritization for periodic high priority uplink communications in accordance with aspects of the present disclosure.

FIG. 6 illustrates an example of a process flow 600 that supports uplink channel prioritization for periodic high priority uplink communications in accordance with aspects of the present disclosure. In some examples, process flow 600 may implement aspects of wireless communications system 100 or 200. Process flow 600 may be implemented by a UE 115-b and a base station 105-b, which may be examples of UEs and base stations as described herein. In the following description of the process flow 600, the communications between the UE 115-b and the base station 105-b may be transmitted in a different order than the example order shown, or the operations performed by the UE 115-b and the base station 105-b may be performed in different orders or at different times. Some operations may also be omitted from the process flow 600, and other operations may be added to the process flow 600.

At 605, the UE 115-b and the base station 105-b may establish communications and configure a high priority uplink SPS configuration. In some cases, the high priority SPS configuration may be for PUCCH resources for transmission of high priority HARQ feedback (e.g., HARQ feedback from a codebook associated with high priority PDSCH transmissions). In other cases, periodic SR resources may be configured and similar techniques may be used to determine channel priority in cases where a low priority resource grant overlaps with the configured SR resources.

At 610, the base station 105-b may allocate low priority resources for an uplink grant. In some cases, the base station 105-b may schedule the low priority resources which are overlapping with the configured periodic high priority uplink resources. In some cases, the base station 105-b may schedule overlapping resources in order to reuse uplink resources associated with HARQ feedback, where corresponding PDSCH transmissions were not communicated to the UE 115-b. In such a manner, resource utilization efficiency may be increased, and latency may be decreased. In other cases, the base station 105-b may schedule the overlapping resources in order to allow the UE 115-b to transmit either the low priority communication in the event that the HARQ feedback of the high priority communication is all ACK or all NACK, or the high priority communication in the event that one of the HARQ feedback is a mix of ACK and NACK. Thus, HARQ feedback may be transmitted explicitly in the case of mixed ACK/NACKs, and implicitly in the case that all feedback bits indicate ACK or NACK. Thus, uplink resources may be utilized more efficiently, which may help increase system throughput and reduce latency. At 615, the base station 105-b may transmit the low priority uplink grant to the UE 115-b.

At 620, the UE 115-b may determine that the low priority resources of the low priority uplink grant overlap with configured high priority resources. At 625, the UE 115-b may determine to drop at least a portion of the high priority transmission or the low priority transmission based on one or more configured priority rules, such as discussed herein. At 630, the UE 115-b may transmit the high priority uplink transmission, the low priority uplink transmission, or combinations thereof to the base station 105-b.

Figure 7:
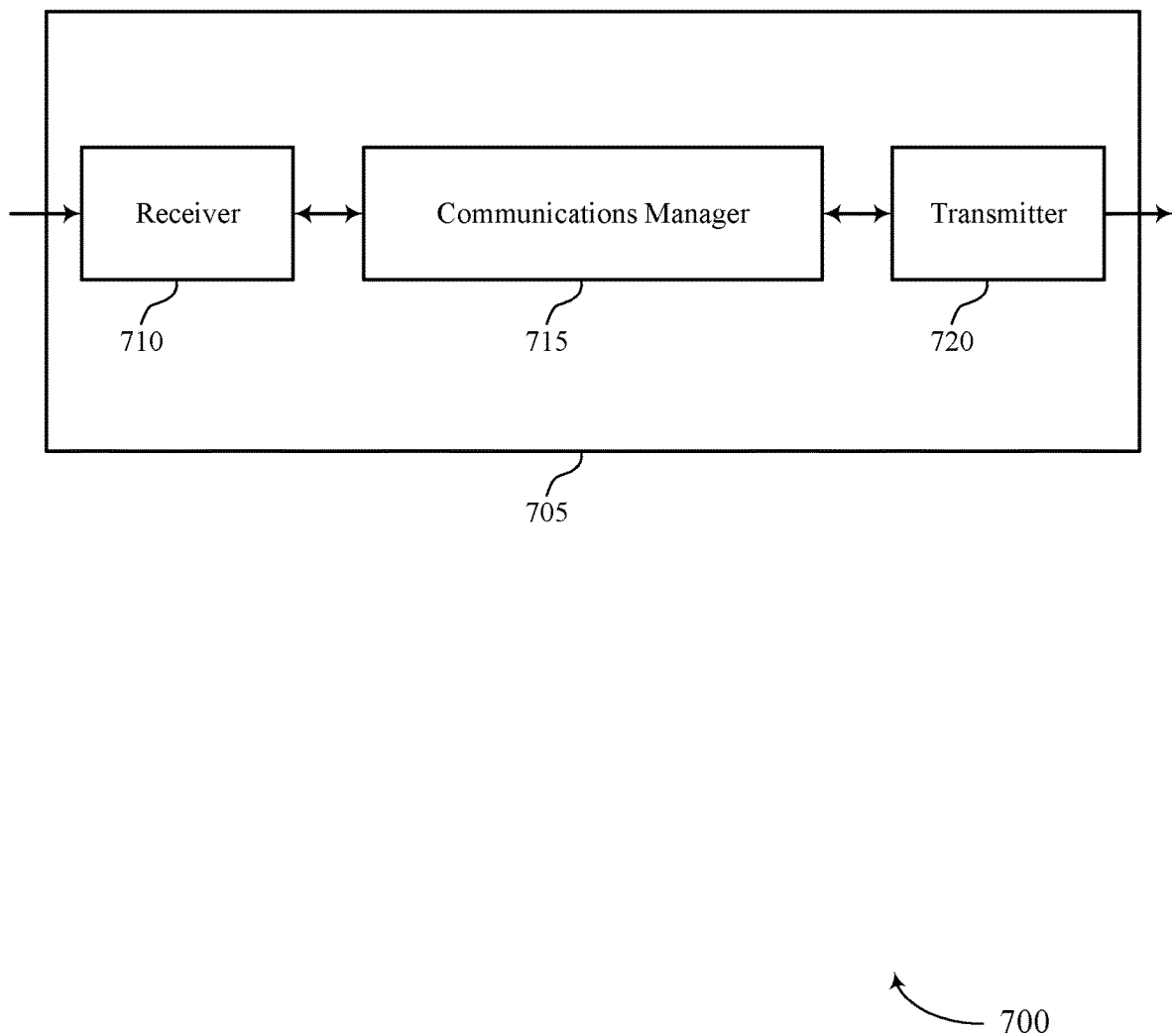
FIGS. 7 and 8 show block diagrams of devices that support uplink channel prioritization for periodic high priority uplink communications in accordance with aspects of the present disclosure.

FIG. 7 shows a block diagram 700 of a device 705 that supports uplink channel prioritization for periodic high priority uplink communications in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to uplink channel prioritization for periodic high priority uplink communications, etc.). Information may be passed on to other components of the device 705. The receiver 710 may be an example of aspects of the transceiver 1020 described with reference to FIG. 10. The receiver 710 may utilize a single antenna or a set of antennas.

In some aspects, the communications manager 715 may determine that a first configured uplink resource of a set of configured uplink resources for uplink communications of a first priority at least partially overlaps in time with a second uplink resource for uplink communications of a second priority that is lower than the first priority. The communications manager 715 may cancel, based on the determining, at least a portion of a second uplink communication of the second priority, starting before or at a first symbol of the second uplink resource that overlaps with a first symbol of the first configured uplink resource. The communications manager 715 may transmit a first uplink communication of the first priority via the first configured uplink resource.

In some aspects, the communications manager 715 may also identify a set of periodic uplink resources for uplink communications of a first priority from the UE to a base station. The communications manager 715 may determine that a first periodic uplink resource of the set of periodic uplink resources at least partially overlaps with a second uplink resource of a second uplink communication of a second priority that is lower than the first priority. The communications manager 715 may cancel, based on the determining, a first uplink communication of the first priority. The communications manager 715 may transmit the second uplink communication via the second uplink resource.

In some aspects, the communications manager 715 may also receive, from a base station, configuration information for a set of configured uplink resources for uplink communications of a first priority from the UE to the base station, where an uplink grant from the base station for an uplink communication of a second priority that is lower than the first priority is expected only to use uplink resources that are non-overlapping with a first configured uplink resource of the plurality of configured uplink resources. The communications manager 715 may receive, from the base station, a first uplink grant for a first uplink communication with a second priority that is higher than the first priority, the first uplink grant indicating first uplink resources that at least partially overlap with the first configured uplink resource. The communications manager 715 may transmit the first uplink communication using the first uplink resources. The communications manager 715 may be an example of aspects of the communications manager 1010 described herein.

The communications manager 715 may as described herein be implemented to realize one or more potential advantages. One implementation may allow the device 705 to enhance resource utilization through more efficient uplink transmission of high priority communications and low priority communications, which may allow for enhanced system throughput and reliability, and reduced latency for certain communications. Further, implementations may allow the device 705 to have additional flexibility for transmitting one or more lower priority uplink communications, among other advantages.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
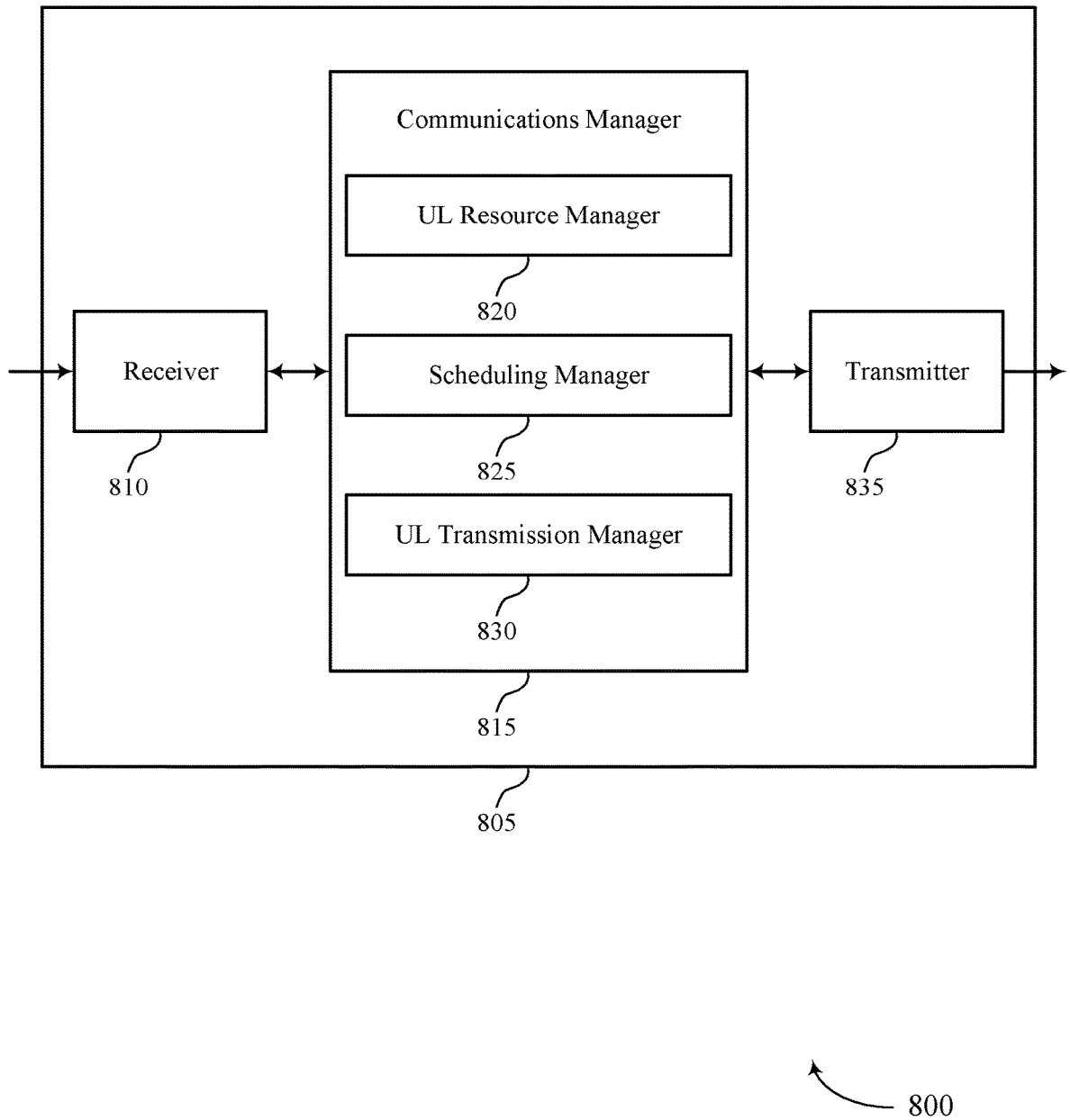

FIG. 8 shows a block diagram 800 of a device 805 that supports uplink channel prioritization for periodic high priority uplink communications in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to uplink channel prioritization for periodic high priority uplink communications, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include an UL resource manager 820, a scheduling manager 825, and an UL transmission manager 830. The communications manager 815 may be an example of aspects of the communications manager 1010 described herein.

In some aspects, the UL resource manager 820 may identify a set of periodic uplink resources for uplink communications of a first priority from the UE to a base station. The scheduling manager 825 may determine that a first configured uplink resource of a set of configured uplink resources for uplink communications of a first priority at least partially overlaps in time with a second uplink resource for uplink communications of a second priority that is lower than the first priority, and cancel, based on the determining, at least a portion of a second uplink communication of the second priority, starting before or at a first symbol of the second uplink resource that overlaps with a first symbol of the first configured uplink resource. The UL transmission manager 830 may transmit a first uplink communication of the first priority via the first configured uplink resource.

In some aspects, the UL resource manager 820 may identify a set of periodic uplink resources for uplink communications of a first priority from the UE to a base station. The scheduling manager 825 may determine that a first periodic uplink resource of the set of periodic uplink resources at least partially overlaps with a second uplink resource of a second uplink communication of a second priority that is lower than the first priority and cancel, based on the determining, a first uplink communication of the first priority. The UL transmission manager 830 may transmit the second uplink communication via the second uplink resource.

In some aspects, the UL resource manager 820 may identify a set of periodic uplink resources for uplink communications of a first priority from the UE to a base station. The scheduling manager 825 may receive, from a base station, configuration information for a set of configured uplink resources for uplink communications of a first priority from the UE to the base station, wherein an uplink grant from the base station for an uplink communication of a second priority that is lower than the first priority is expected only to use uplink resources that are non-overlapping with a first configured uplink resource of the plurality of configured uplink resources. The scheduling manager 825 may also receive, from the base station, a first uplink grant for a first uplink communication with a second priority that is higher than the first priority, the first uplink grant indicating first uplink resources that at least partially overlap with the first configured uplink resource. The UL transmission manager 830 may transmit the first uplink communication using the first uplink resources.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
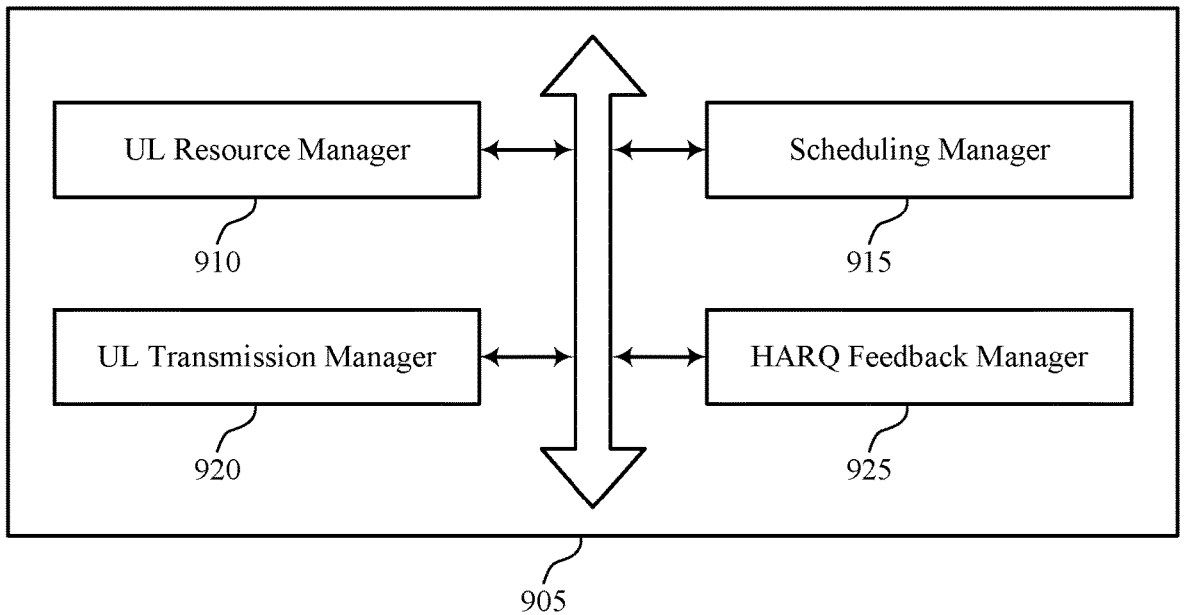
FIG. 9 shows a block diagram of a communications manager that supports uplink channel prioritization for periodic high priority uplink communications in accordance with aspects of the present disclosure.

FIG. 9 shows a block diagram 900 of a communications manager 905 that supports uplink channel prioritization for periodic high priority uplink communications in accordance with aspects of the present disclosure. The communications manager 905 may be an example of aspects of a communications manager 715, a communications manager 815, or a communications manager 1010 described herein. The communications manager 905 may include an UL resource manager 910, a scheduling manager 915, an UL transmission manager 920, and a HARQ feedback manager 925. Each of these modules may communicate, directly or indirectly, with one another (e.g., via one or more buses).

The UL resource manager 910 may identify a set of periodic uplink resources for uplink communications of a first priority from the UE to a base station. In some cases, the set of periodic uplink resources for uplink communications of the first priority include SPS resources for transmission of the uplink communications of the first priority, and where the second uplink communication of the second priority is a dynamically granted uplink communication.

The scheduling manager 915 may determine that a first configured uplink resource of a set of configured uplink resources for uplink communications of a first priority at least partially overlaps in time with a second uplink resource for uplink communications of a second priority that is lower than the first priority. In some examples, the scheduling manager 915 may cancel, based on the determining, at least a portion of a second uplink communication starting before or at a first symbol of the second uplink resource that overlaps with a first symbol of the first configured uplink resource.

In other examples, the scheduling manager 915 may determine that a first configured uplink resource of the set of configured uplink resources at least partially overlaps with a second uplink resource of a second uplink communication of a second priority that is lower than the first priority, and the scheduling manager 915 may cancel, based on the determining, a first uplink communication of the first priority. In some examples, the scheduling manager 915 may ignore the uplink grant for the uplink communication of the second priority. In some examples, the second uplink resource for uplink communications of the second priority is a semi-persistent uplink resource for uplink communications of the second priority.

In some examples, the scheduling manager 915 may receive an uplink grant for the dynamically granted uplink resource at or prior to a threshold number of symbols before an earliest symbol of the SPS resource of the first uplink communication of the first priority.

In some examples, the scheduling manager 915 may determine, after the transmitting, that a second periodic uplink resource of the set of periodic uplink resources at least partially overlaps with a third uplink resource of a second uplink communication of the second priority.

In some examples, the scheduling manager 915 may cancel, based on the second uplink communication of the first priority including at least one NACK, at least a portion of the second uplink communication of the second priority.

In some cases, the uplink communications of the first priority include high priority (HP) acknowledgment feedback for one or more downlink transmissions, or a HP scheduling request (SR) transmission to the base station.

In some cases, the dynamically granted uplink communication of the second priority is for a physical uplink shared channel transmission or a physical uplink control channel transmission carrying acknowledgment feedback information of the second priority. In some cases, the set of periodic uplink resources for uplink communications of the first priority include semi-persistent scheduled (SPS) resources for transmission of acknowledgment feedback or scheduling requests. In some cases, the configured uplink resource is for transmission of one or more of a lower priority scheduling request, a lower priority channel state information transmission, lower priority acknowledgment feedback, or any combinations thereof.

In some cases, the uplink grant for the dynamically granted uplink resource is ignored when received after the threshold number of symbols before the earliest symbol of the SPS resource of the first uplink communication of the first priority. In some cases, the second uplink communication of the second priority is cancelled starting at a first overlapping symbol of the second periodic uplink resource and the third uplink resource.

The UL transmission manager 920 may transmit a first uplink communication of the first priority via the first periodic uplink resource. In some examples, the UL transmission manager 920 may transmit the second uplink communication via the second uplink resource.

The HARQ feedback manager 925 may determine, prior to the cancelling, that the acknowledgment feedback for the one or more HP downlink communications includes all negative acknowledgments (NACKs), and where the cancelling is performed responsive to the acknowledgment feedback including all NACKs. In some examples, it may be determined, prior to the cancelling, that the acknowledgment feedback for the one or more HP downlink communications includes all positive acknowledgments (ACKs), and where the cancelling is performed responsive to the acknowledgment feedback for the one or more HP downlink communications including all ACKs.

In some examples, the HARQ feedback manager 925 may determine that acknowledgment feedback to be transmitted in a second uplink communication of the first priority includes at least one negative acknowledgment (NACK), and the high priority communication may be transmitted.

Figure 10:
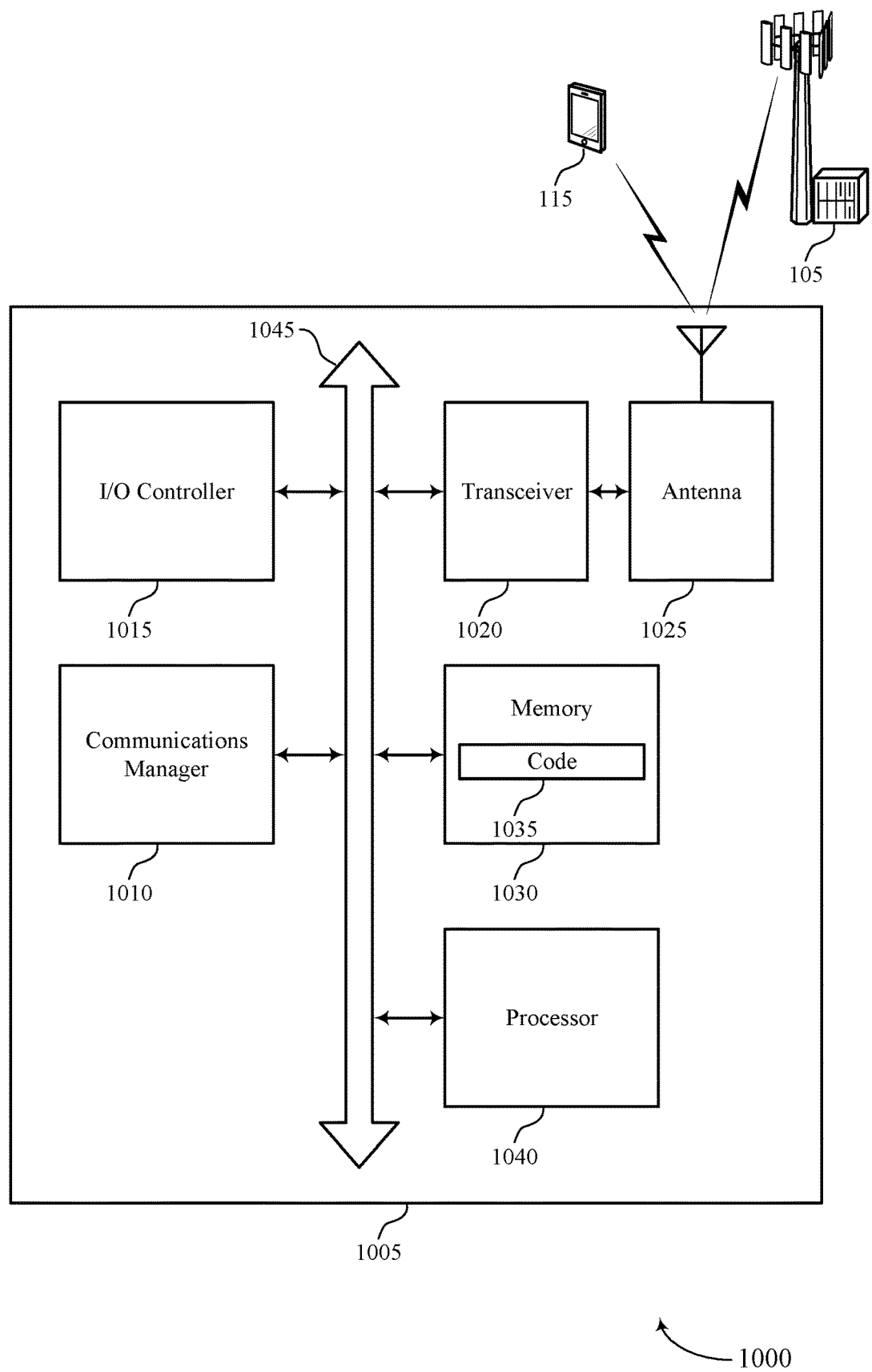
FIG. 10 shows a diagram of a system including a device that supports uplink channel prioritization for periodic high priority uplink communications in accordance with aspects of the present disclosure.

FIG. 10 shows a diagram of a system 1000 including a device 1005 that supports uplink channel prioritization for periodic high priority uplink communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

In some aspects, the communications manager 1010 may identify a set of periodic uplink resources for uplink communications of a first priority from the UE to a base station, determine that a first configured uplink resource of the set of configured uplink resources at least partially overlaps with a second uplink resource for uplink communications of a second priority that is lower than the first priority, cancel, based on the determining, at least a portion of a second uplink communication of the second priority, starting before or at a first overlapping symbol of the first configured uplink resource and the second uplink resource, and transmit a first uplink communication of the first priority via the first configured uplink resource.

In some aspects, the communications manager 1010 may also identify a set of configured uplink resources for uplink communications of a first priority from the UE to a base station, determine that a first configured uplink resource of the set of configured uplink resources at least partially overlaps with a second uplink resource of a second uplink communication of a second priority that is lower than the first priority, cancel, based on the determining, a first uplink communication of the first priority, and transmit the second uplink communication via the second uplink resource.

In some aspects, the communications manager 1010 may also identify a set of configured uplink resources for uplink communications of a first priority from the UE to a base station, receive, from the base station, an uplink grant for an uplink communication of a second priority that is lower than the first priority, where the uplink grant at least partially overlaps with a first configured uplink resource of the set of configured uplink resources, ignore the uplink grant for the uplink communication of the second priority, and transmit a first uplink communication of the first priority via the first configured uplink resource.

The communications manager 1010 may as described herein be implemented to realize one or more potential advantages. One implementation may allow the device 1005 to enhance resource utilization through more efficient uplink transmission of high priority communications and low priority communications, which may allow for enhanced system throughput and reliability, and reduced latency for certain communications. Further, implementations may allow the device 1005 to have additional flexibility for transmitting one or more lower priority uplink communications, among other advantages.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting uplink channel prioritization for configured high priority uplink communications).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
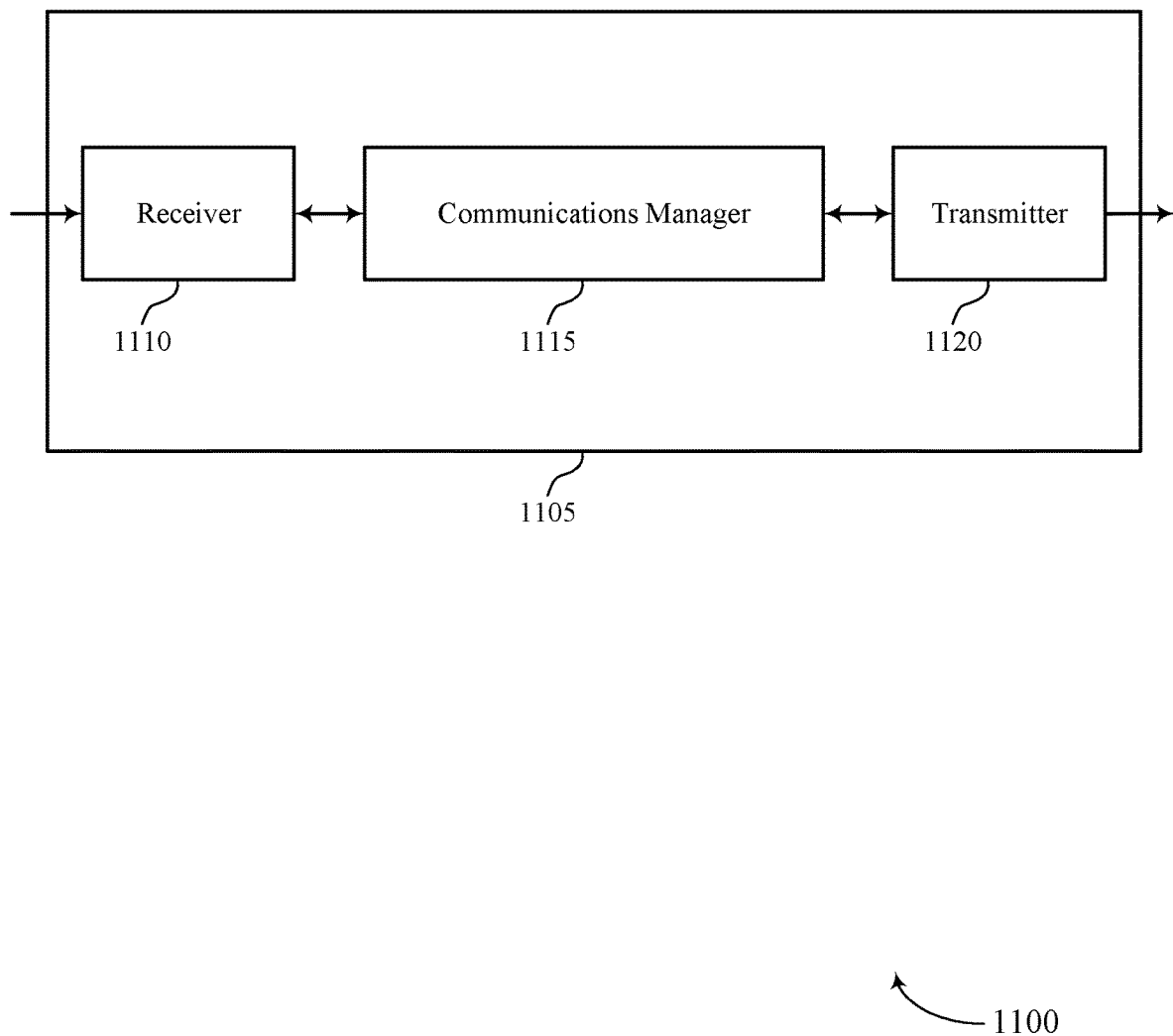
FIGS. 11 and 12 show block diagrams of devices that support uplink channel prioritization for periodic high priority uplink communications in accordance with aspects of the present disclosure.

FIG. 11 shows a block diagram 1100 of a device 1105 that supports uplink channel prioritization for configured high priority uplink communications in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to uplink channel prioritization for configured high priority uplink communications, etc.). Information may be passed on to other components of the device 1105. The receiver 1110 may be an example of aspects of the transceiver 1420 described with reference to FIG. 14. The receiver 1110 may utilize a single antenna or a set of antennas.

In some aspects, the communications manager 1115 may configure a set of uplink resources for uplink communications of a first priority from a UE to the base station. The communications manager 1115 may determine that a first configured uplink resource of the set of configured uplink resources at least partially overlaps with a second uplink resource of a second uplink communication of a second priority that is lower than the first priority. The communications manager 1115 may cancel, based on the determining, at least a portion of the second uplink communication starting before or at a first overlapping symbol of the first configured uplink resource and the second uplink resource. The communications manager 1115 may receive a first uplink communication of the first priority via the first configured uplink resource.

In some aspects, the communications manager 1115 may also configure a set of configured uplink resources for uplink communications of a first priority from a UE to the base station. The communications manager 1115 may determine that a first configured uplink resource of the set of configured uplink resources at least partially overlaps with a second uplink resource of a second uplink communication of a second priority that is lower than the first priority. The communications manager 1115 may cancel, based on the determining, a first uplink communication of the first priority. The communications manager 1115 may receive the second uplink communication of the second priority via the second uplink resource. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
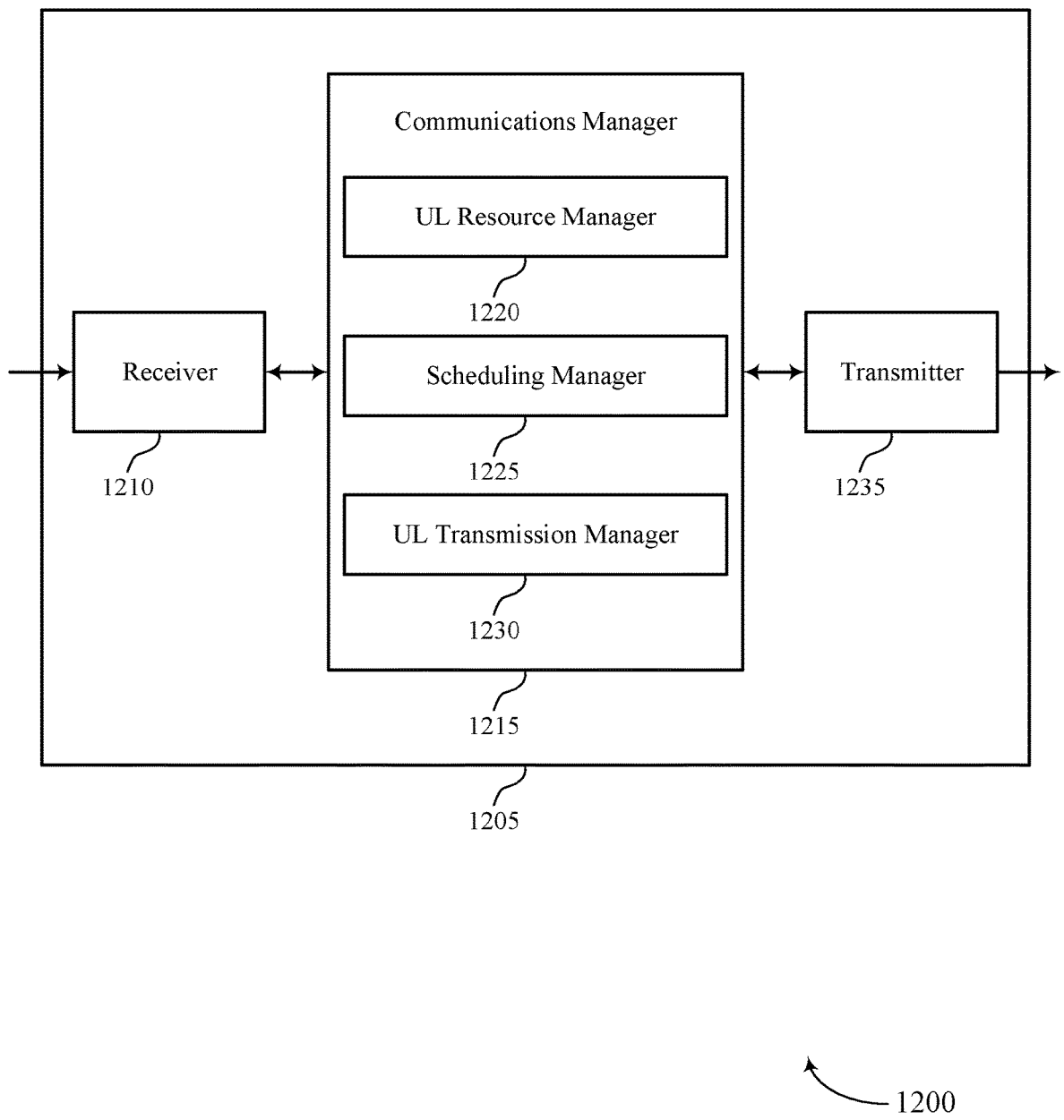

FIG. 12 shows a block diagram 1200 of a device 1205 that supports uplink channel prioritization for configured high priority uplink communications in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to uplink channel prioritization for configured high priority uplink communications, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include an UL resource manager 1220, a scheduling manager 1225, and an UL transmission manager 1230. The communications manager 1215 may be an example of aspects of the communications manager 1410 described herein.

In some aspects, the UL resource manager 1220 may configure a set of configured uplink resources for uplink communications of a first priority from a UE to the base station. The scheduling manager 1225 may determine that a first configured uplink resource of the set of configured uplink resources at least partially overlaps with a second uplink resource of a second uplink communication of a second priority that is lower than the first priority and cancel, based on the determining, at least a portion of the second uplink communication starting at a first overlapping symbol of the first configured uplink resource and the second uplink resource. The UL transmission manager 1230 may receive a first uplink communication of the first priority via the first configured uplink resource.

In some aspects, the UL resource manager 1220 may configure a set of configured uplink resources for uplink communications of a first priority from a UE to the base station. The scheduling manager 1225 may determine that a first configured uplink resource of the set of configured uplink resources at least partially overlaps with a second uplink resource of a second uplink communication of a second priority that is lower than the first priority and cancel, based on the determining, a first uplink communication of the first priority. The UL transmission manager 1230 may receive the second uplink communication of the second priority via the second uplink resource.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
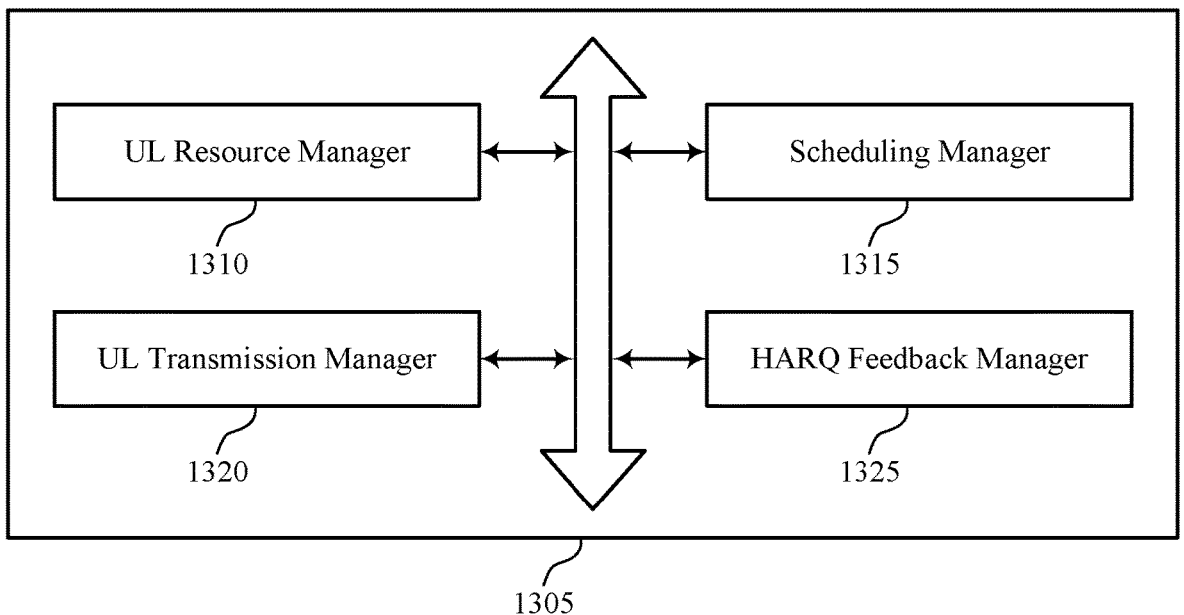
FIG. 13 shows a block diagram of a communications manager that supports uplink channel prioritization for periodic high priority uplink communications in accordance with aspects of the present disclosure.

FIG. 13 shows a block diagram 1300 of a communications manager 1305 that supports uplink channel prioritization for configured high priority uplink communications in accordance with aspects of the present disclosure. The communications manager 1305 may be an example of aspects of a communications manager 1115, a communications manager 1215, or a communications manager 1410 described herein. The communications manager 1305 may include an UL resource manager 1310, a scheduling manager 1315, an UL transmission manager 1320, and a HARQ feedback manager 1325. Each of these modules may communicate, directly or indirectly, with one another (e.g., via one or more buses).

The UL resource manager 1310 may configure a set of configured uplink resources for uplink communications of a first priority from a UE to the base station.

In some cases, the set of configured uplink resources for uplink communications of the first priority include semi-persistent scheduled (SPS) resources for transmission of the uplink communications of the first priority, and where the second uplink communication is a dynamically granted uplink communication of the second priority.

The scheduling manager 1315 may determine that a first configured uplink resource of the set of configured uplink resources at least partially overlaps with a second uplink resource of a second uplink communication of a second priority that is lower than the first priority. In some examples, the scheduling manager 1315 may cancel, based on the determining, at least a portion of the second uplink communication starting at a first overlapping symbol of the first configured uplink resource and the second uplink resource.

In some examples, the scheduling manager 1315 may determine that a first configured uplink resource of the set of configured uplink resources at least partially overlaps with a second uplink resource of a second uplink communication of a second priority that is lower than the first priority. In some examples, the scheduling manager 1315 may cancel, based on the determining, a first uplink communication of the first priority.

In some examples, the second uplink resource is a configured uplink resource for uplink communications of the second priority. In some examples, the scheduling manager 1315 may determine to grant the second uplink resource for the second uplink communication to the UE. In some examples, the scheduling manager 1315 may determine, responsive to the determining to grant the second uplink resource, to skip one or more of the HP downlink communications to the UE that are to have acknowledgment feedback provided in the first configured uplink resource.

In some examples, the scheduling manager 1315 may transmit an uplink grant for the dynamically granted uplink resource to the UE at or prior to a threshold number of symbols before an earliest symbol of the SPS resource of the first uplink communication of the first priority.

In some cases, the uplink communications of the first priority include high priority (HP) acknowledgment feedback for one or more HP downlink transmissions, or a HP scheduling request (SR) transmission of the UE.

In some cases, the dynamically granted uplink communication of the second priority is for a lower priority physical uplink shared channel transmission or a lower priority physical uplink control channel transmission carrying acknowledgment feedback information.

In some cases, the set of configured uplink resources for uplink communications of the first priority include semi-persistent scheduled (SPS) resources for transmission of acknowledgment feedback or scheduling requests. In some cases, the configured uplink resource is for transmission of one or more of a lower priority scheduling request, a lower priority channel state information transmission, lower priority acknowledgment feedback, or any combinations thereof. In some cases, the uplink communications of the first priority include high priority (HP) acknowledgment feedback for one or more HP downlink communications, or scheduling request (SR) resources for transmission of a HP SR to the base station.

The UL transmission manager 1320 may receive a first uplink communication of the first priority via the first configured uplink resource. In some examples, the UL transmission manager 1320 may receive the second uplink communication of the second priority via the second uplink resource.

The HARQ feedback manager 1325 may determine, based on receiving the second uplink communication from the UE, that the acknowledgment feedback for the one or more HP downlink communications includes all positive acknowledgments (ACKs).

Figure 14:
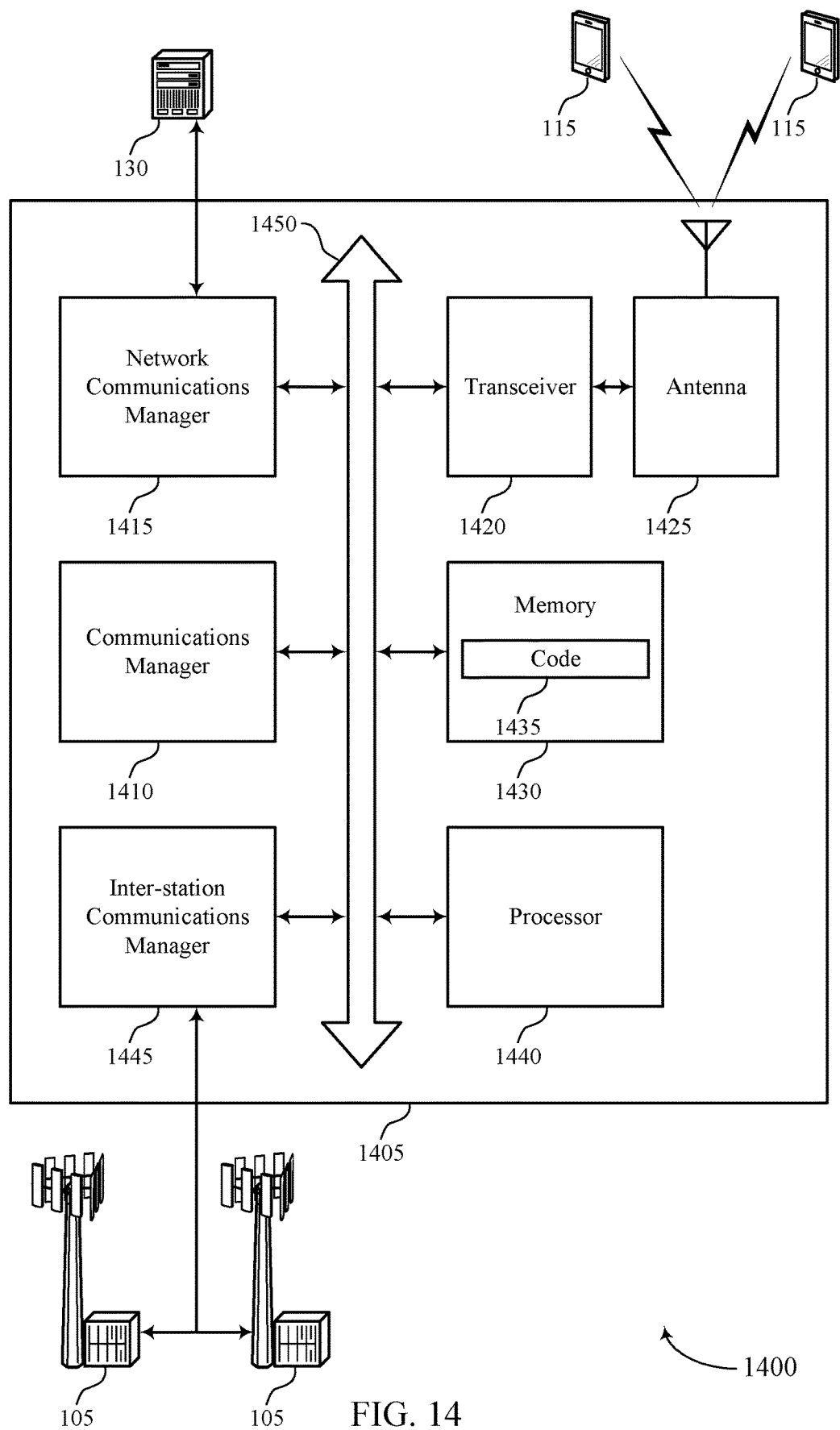
FIG. 14 shows a diagram of a system including a device that supports uplink channel prioritization for periodic high priority uplink communications in accordance with aspects of the present disclosure.

FIG. 14 shows a diagram of a system 1400 including a device 1405 that supports uplink channel prioritization for configured high priority uplink communications in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

In some aspects, the communications manager 1410 may configure a set of configured uplink resources for uplink communications of a first priority from a UE to the base station, determine that a first configured uplink resource of the set of configured uplink resources at least partially overlaps with a second uplink resource of a second uplink communication of a second priority that is lower than the first priority, cancel, based on the determining, at least a portion of the second uplink communication starting at a first overlapping symbol of the first configured uplink resource and the second uplink resource, and receive a first uplink communication of the first priority via the first configured uplink resource.

In some aspects, the communications manager 1410 may also configure a set of configured uplink resources for uplink communications of a first priority from a UE to the base station, determine that a first configured uplink resource of the set of configured uplink resources at least partially overlaps with a second uplink resource of a second uplink communication of a second priority that is lower than the first priority, cancel, based on the determining, a first uplink communication of the first priority, and receive the second uplink communication of the second priority via the second uplink resource.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting uplink channel prioritization for configured high priority uplink communications).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
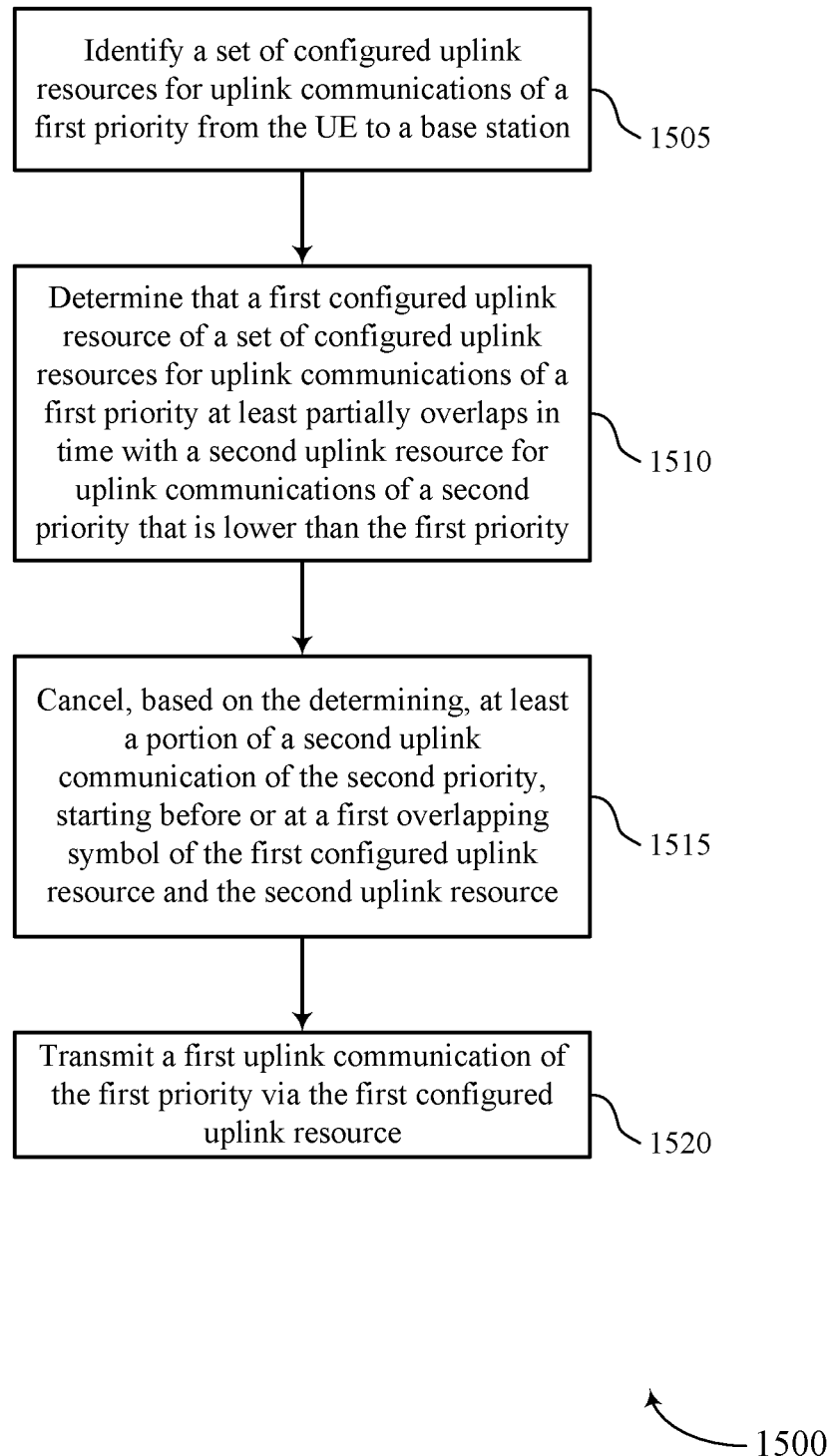
FIGS. 15 through 19 show flowcharts illustrating methods that support uplink channel prioritization for periodic high priority uplink communications in accordance with aspects of the present disclosure.

FIG. 15 shows a flowchart illustrating a method 1500 that supports uplink channel prioritization for configured high priority uplink communications in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may identify a set of configured uplink resources for uplink communications of a first priority from the UE to a base station. The operations of 1505 may be performed according to the methods described herein. In some examples, aspects of the operations of 1505 may be performed by an UL resource manager as described with reference to FIGS. 7 through 10.

At 1510, the UE may determine that a first configured uplink resource of a set of configured uplink resources for uplink communications of a first priority at least partially overlaps in time with a second uplink resource for uplink communications of a second priority that is lower than the first priority. The operations of 1510 may be performed according to the methods described herein. In some examples, aspects of the operations of 1510 may be performed by a scheduling manager as described with reference to FIGS. 7 through 10.

At 1515, the UE may cancel, based on the determining, at least a portion of a second uplink communication of the second priority, starting before or at a first overlapping symbol of the first configured uplink resource and the second uplink resource. The operations of 1515 may be performed according to the methods described herein. In some examples, aspects of the operations of 1515 may be performed by a scheduling manager as described with reference to FIGS. 7 through 10.

At 1520, the UE may transmit a first uplink communication of the first priority via the first configured uplink resource. The operations of 1520 may be performed according to the methods described herein. In some examples, aspects of the operations of 1520 may be performed by an UL transmission manager as described with reference to FIGS. 7 through 10.

Figure 16:
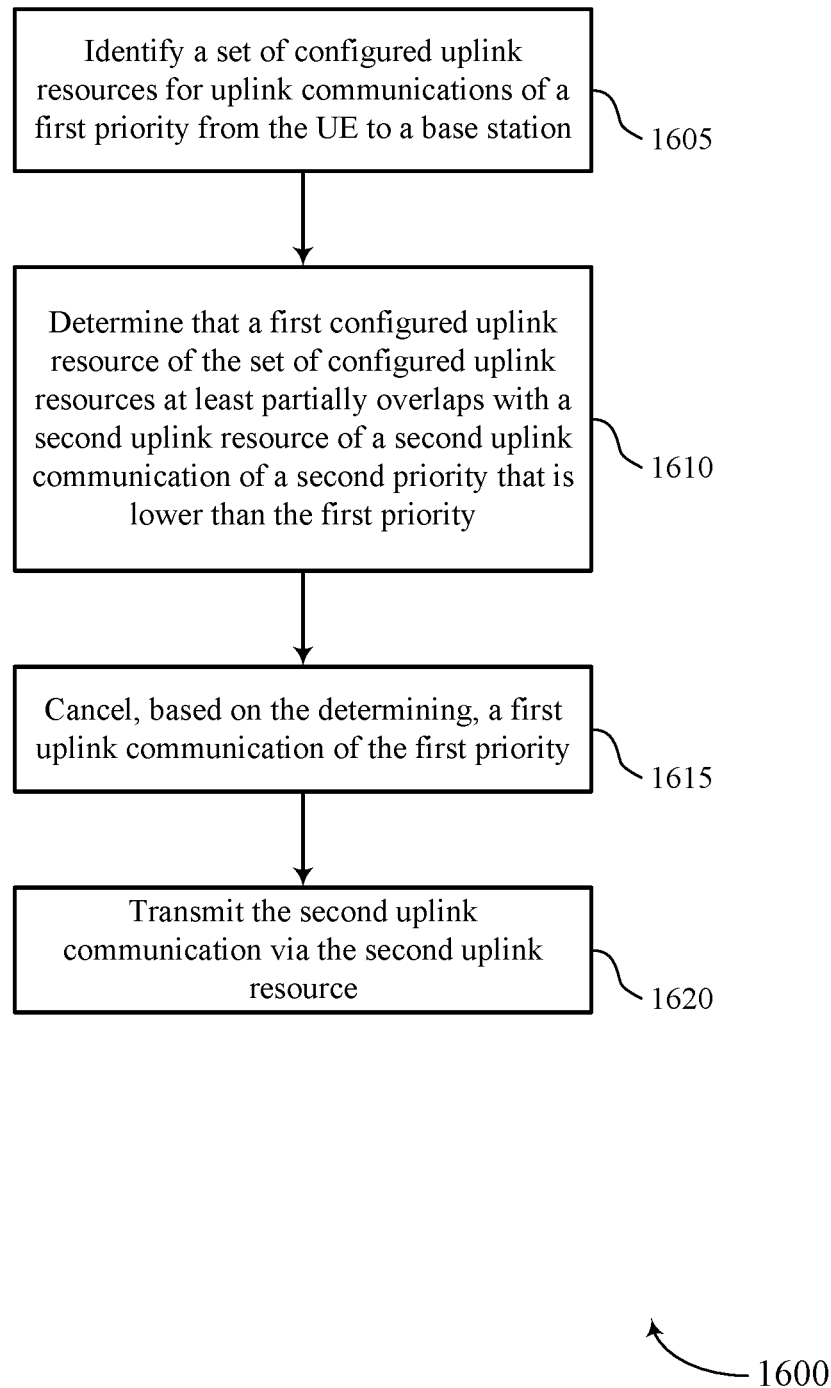

FIG. 16 shows a flowchart illustrating a method 1600 that supports uplink channel prioritization for configured high priority uplink communications in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, configuration information for a set of configured uplink resources for uplink communications of a first priority from the UE to the base station, where an uplink grant from the base station for an uplink communication of a second priority that is lower than the first priority is expected only to use uplink resources that are non-overlapping with a first configured uplink resource of the plurality of configured uplink resources. The operations of 1605 may be performed according to the methods described herein. In some examples, aspects of the operations of 1605 may be performed by an UL resource manager as described with reference to FIGS. 7 through 10.

At 1610, the UE may determine that a first configured uplink resource of the set of configured uplink resources at least partially overlaps with a second uplink resource of a second uplink communication of a second priority that is lower than the first priority. The operations of 1610 may be performed according to the methods described herein. In some examples, aspects of the operations of 1610 may be performed by a scheduling manager as described with reference to FIGS. 7 through 10.

At 1615, the UE may cancel, based on the determining, a first uplink communication of the first priority. The operations of 1615 may be performed according to the methods described herein. In some examples, aspects of the operations of 1615 may be performed by a scheduling manager as described with reference to FIGS. 7 through 10.

At 1620, the UE may transmit the second uplink communication via the second uplink resource. The operations of 1620 may be performed according to the methods described herein. In some examples, aspects of the operations of 1620 may be performed by an UL transmission manager as described with reference to FIGS. 7 through 10.

Figure 17:
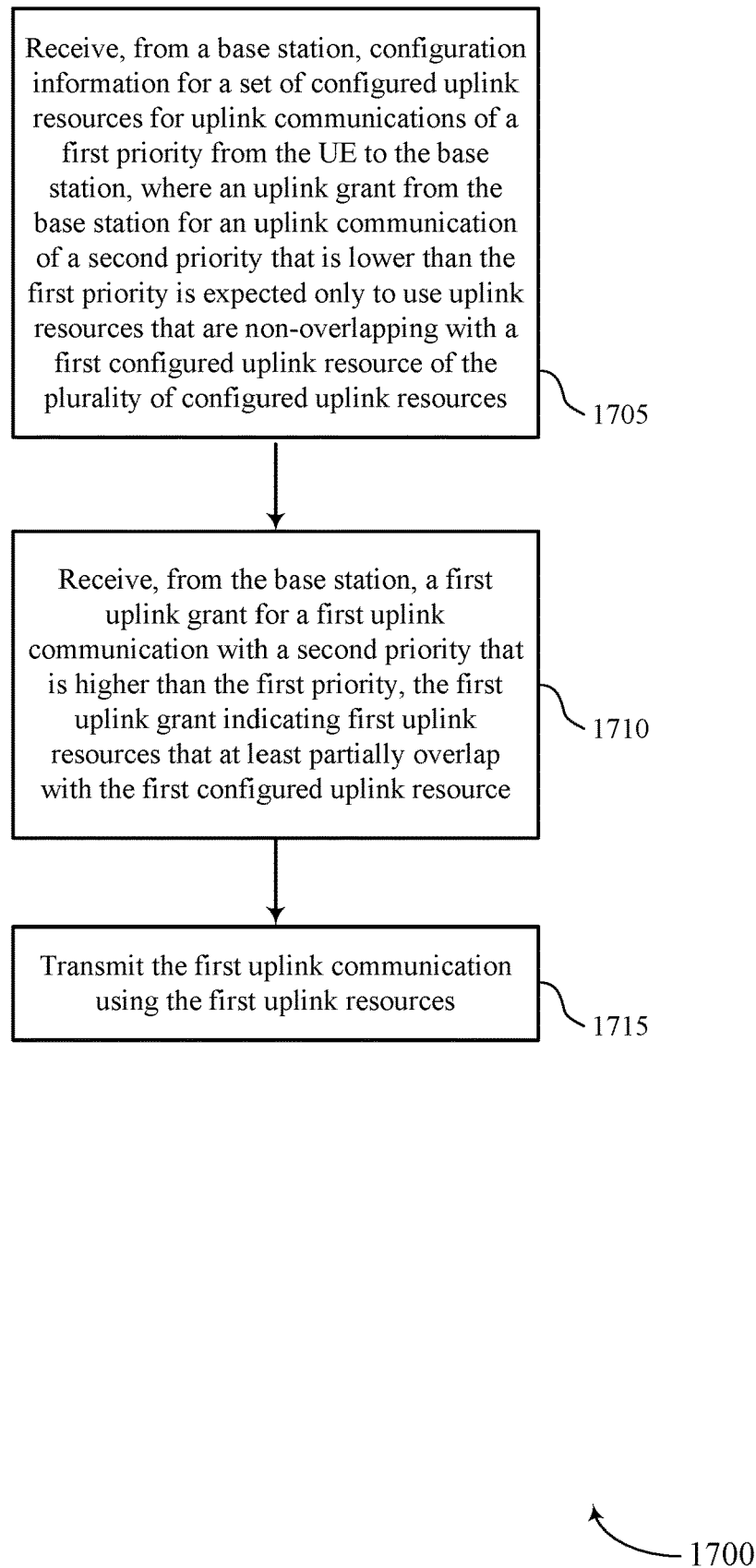

FIG. 17 shows a flowchart illustrating a method 1700 that supports uplink channel prioritization for configured high priority uplink communications in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, configuration information for a set of configured uplink resources for uplink communications of a first priority from the UE to the base station, where an uplink grant from the base station for an uplink communication of a second priority that is lower than the first priority is expected only to use uplink resources that are non-overlapping with a first configured uplink resource of the plurality of configured uplink resources. The operations of 1705 may be performed according to the methods described herein. In some examples, aspects of the operations of 1705 may be performed by an UL resource manager as described with reference to FIGS. 7 through 10.

At 1710, the UE may receive, from the base station, a first uplink grant for a first uplink communication with a second priority that is higher than the first priority, the first uplink grant indicating first uplink resources that at least partially overlap with the first configured uplink resource. The operations of 1710 may be performed according to the methods described herein. In some examples, aspects of the operations of 1710 may be performed by a scheduling manager as described with reference to FIGS. 7 through 10.

At 1715, the UE may transmit the first uplink communication using the first uplink resources. The operations of 1715 may be performed according to the methods described herein. In some examples, aspects of the operations of 1715 may be performed by an UL transmission manager as described with reference to FIGS. 7 through 10.

Figure 18:
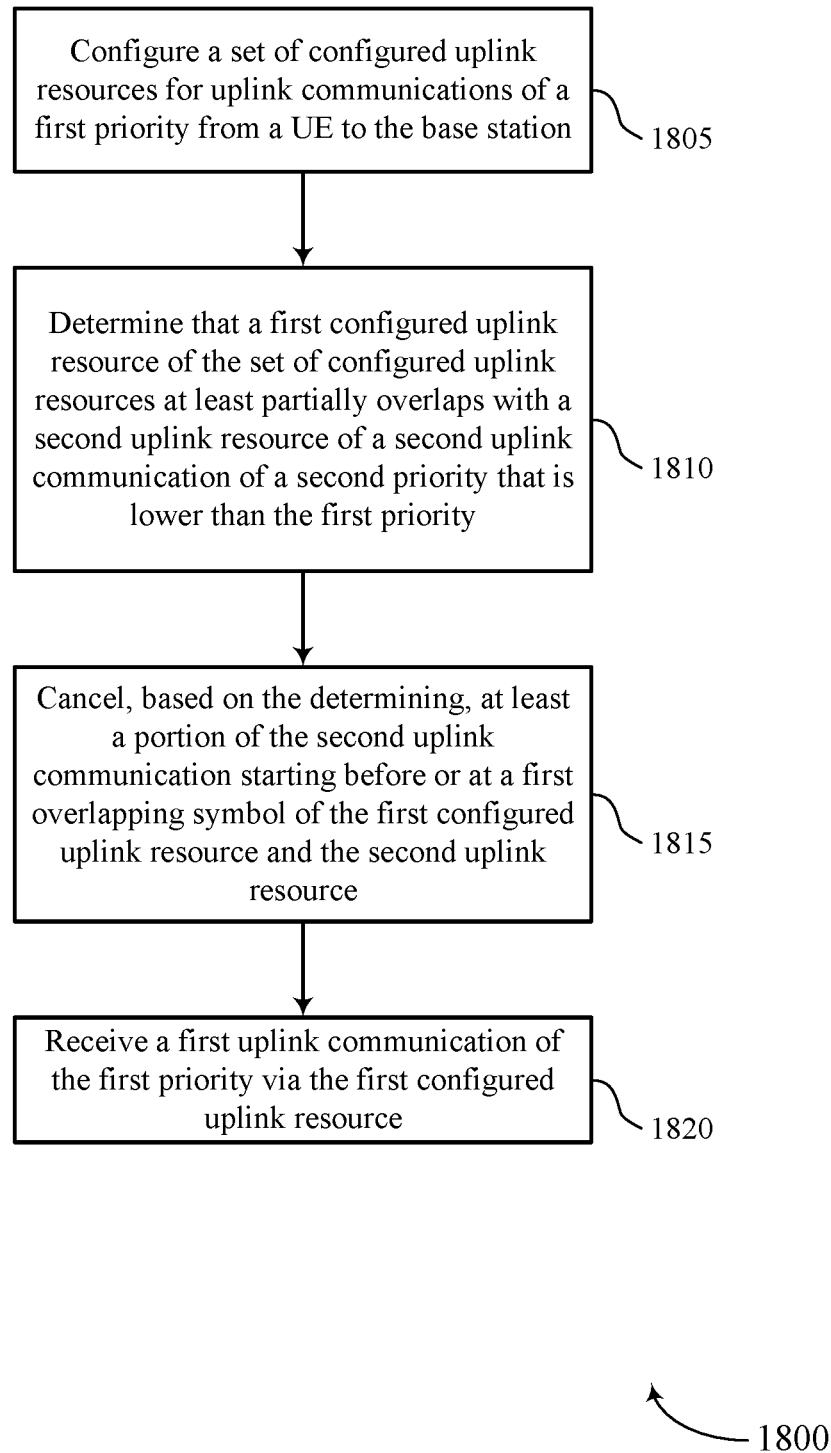

FIG. 18 shows a flowchart illustrating a method 1800 that supports uplink channel prioritization for configured high priority uplink communications in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may configure a set of configured uplink resources for uplink communications of a first priority from a UE to the base station. The operations of 1805 may be performed according to the methods described herein. In some examples, aspects of the operations of 1805 may be performed by an UL resource manager as described with reference to FIGS. 11 through 14.

At 1810, the base station may determine that a first configured uplink resource of the set of configured uplink resources at least partially overlaps with a second uplink resource of a second uplink communication of a second priority that is lower than the first priority. The operations of 1810 may be performed according to the methods described herein. In some examples, aspects of the operations of 1810 may be performed by a scheduling manager as described with reference to FIGS. 11 through 14.

At 1815, the base station may cancel, based on the determining, at least a portion of the second uplink communication starting before or at a first overlapping symbol of the first configured uplink resource and the second uplink resource. The operations of 1815 may be performed according to the methods described herein. In some examples, aspects of the operations of 1815 may be performed by a scheduling manager as described with reference to FIGS. 11 through 14.

At 1820, the base station may receive a first uplink communication of the first priority via the first configured uplink resource. The operations of 1820 may be performed according to the methods described herein. In some examples, aspects of the operations of 1820 may be performed by an UL transmission manager as described with reference to FIGS. 11 through 14.

Figure 19:
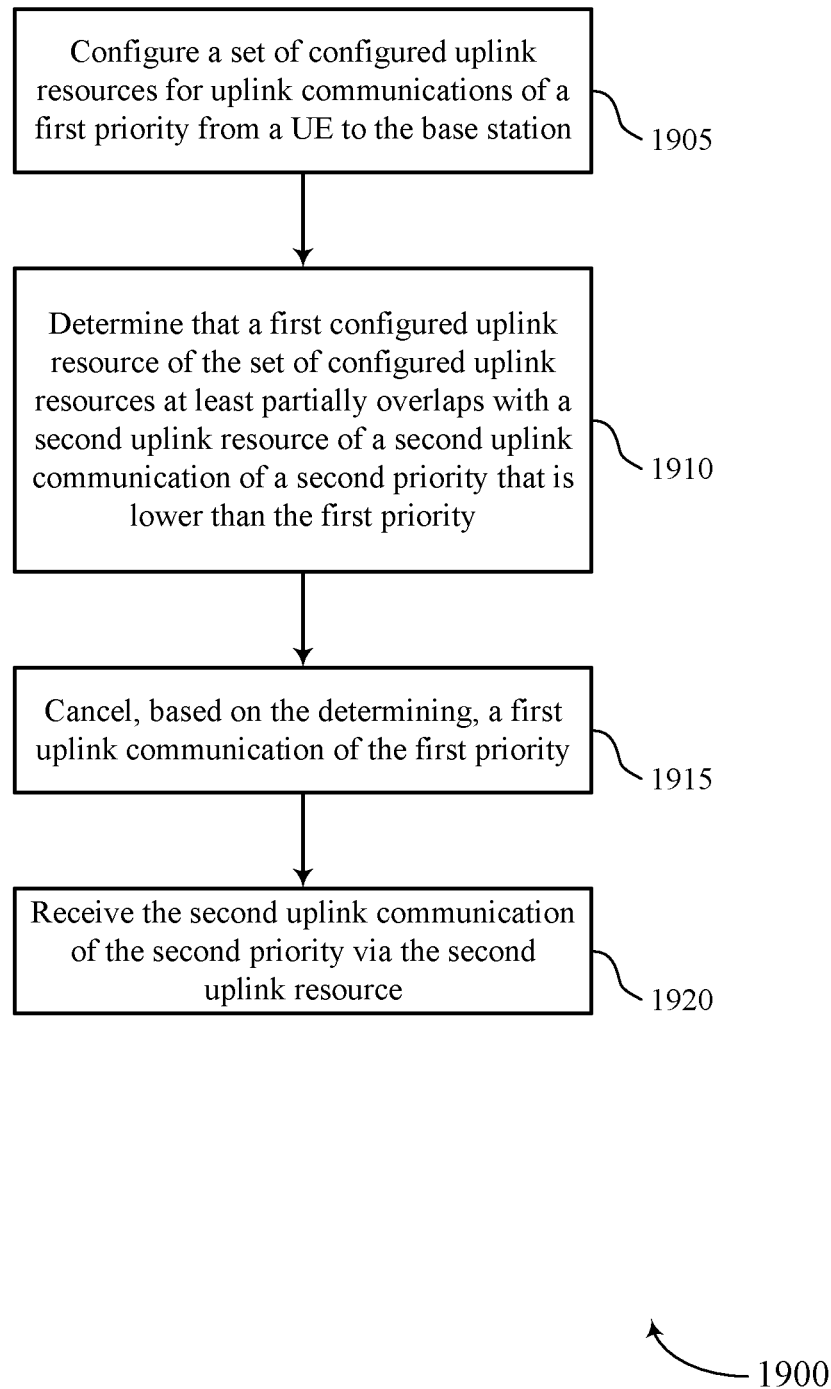

FIG. 19 shows a flowchart illustrating a method 1900 that supports uplink channel prioritization for configured high priority uplink communications in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may configure a set of configured uplink resources for uplink communications of a first priority from a UE to the base station. The operations of 1905 may be performed according to the methods described herein. In some examples, aspects of the operations of 1905 may be performed by an UL resource manager as described with reference to FIGS. 11 through 14.

At 1910, the base station may determine that a first configured uplink resource of the set of configured uplink resources at least partially overlaps with a second uplink resource of a second uplink communication of a second priority that is lower than the first priority. The operations of 1910 may be performed according to the methods described herein. In some examples, aspects of the operations of 1910 may be performed by a scheduling manager as described with reference to FIGS. 11 through 14.

At 1915, the base station may cancel, based on the determining, a first uplink communication of the first priority. The operations of 1915 may be performed according to the methods described herein. In some examples, aspects of the operations of 1915 may be performed by a scheduling manager as described with reference to FIGS. 11 through 14.

At 1920, the base station may receive the second uplink communication of the second priority via the second uplink resource. The operations of 1920 may be performed according to the methods described herein. In some examples, aspects of the operations of 1920 may be performed by an UL transmission manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: determining that a first configured uplink resource of a plurality of configured uplink resources for uplink communications of a first priority at least partially overlaps in time with a second uplink resource for uplink communications of a second priority that is lower than the first priority; cancelling, based at least in part on the determining, at least a portion of a second uplink communication of the second priority, starting before or at a first symbol of the second uplink resource that overlaps with a first symbol of the first configured uplink resource; and transmitting a first uplink communication of the first priority via the first configured uplink resource.

Aspect 2: The method of aspect 1, wherein the plurality of configured uplink resources for uplink communications of the first priority comprise semi-persistent scheduled (SPS) resources for transmission of the uplink communications of the first priority, scheduling request resources, semi-persistent channel state information report resources, or physical uplink control channel resources, and the second uplink communication of the second priority is a dynamically granted uplink communication.

Aspect 3: The method of aspect 2, wherein the uplink communications of the first priority comprise high priority (HP) acknowledgment feedback for one or more downlink transmissions, or a HP scheduling request (SR) transmission to a base station.

Aspect 4: The method of any of aspects 2 through 3, wherein the dynamically granted uplink communication of the second priority is for a physical uplink shared channel transmission or a physical uplink control channel transmission carrying acknowledgment feedback information of the second priority.

Aspect 5: The method of any of aspects 1 through 4, wherein the plurality of configured uplink resources for uplink communications of the first priority comprise semi-persistent scheduled (SPS) resources for transmission of acknowledgment feedback or scheduling requests; and wherein the second uplink resource for uplink communications of the second priority is a semi-persistent uplink resource for uplink communications of the second priority.

Aspect 6: The method of aspect 5, wherein the semi-persistent uplink resource is for transmission of one or more of a lower priority scheduling request, a lower priority channel state information transmission, lower priority acknowledgment feedback, or any combinations thereof.

Aspect 7: A method for wireless communication at a UE, comprising: receiving, from a base station, configuration information for a plurality of configured uplink resources for uplink communications of a first priority from the UE to the base station, wherein an uplink grant from the base station for an uplink communication of a second priority that is lower than the first priority is expected only to use uplink resources that are non-overlapping with a first configured uplink resource of the plurality of configured uplink resources; receiving, from the base station, a first uplink grant for a first uplink communication with a third priority that is higher than the first priority, the first uplink grant indicating first uplink resources that at least partially overlap with the first configured uplink resource; and transmitting the first uplink communication using the first uplink resources.

Aspect 8: The method of aspect 7, wherein the UE is not expected to be scheduled with a PUCCH of a lower priority carrying acknowledgment feedback information in response to an PDSCH without a corresponding PDCCH overlapping with a PUCCH transmission or a PUSCH transmission of a higher priority.

Aspect 9: The method of any of aspects 7 through 8, wherein the plurality of configured uplink resources for uplink communications of the first priority comprise semi-persistent scheduled (SPS) resources for transmission of the uplink communications of the first priority.

Aspect 10: The method of aspect 9, wherein the uplink communications of the first priority comprise high priority (HP) acknowledgment feedback for one or more HP downlink transmissions, or a HP scheduling request (SR) transmission to the base station.

Aspect 11: The method of any of aspects 9 through 10, wherein the UE does not expect to receive a dynamically granted uplink communication of the second priority for a physical uplink shared channel transmission or a physical uplink control channel transmission carrying acknowledgment feedback information that overlaps with any of the plurality of configured uplink resources.

Aspect 12: The method of any of aspects 7 through 11, wherein the plurality of configured uplink resources for uplink communications of the first priority comprise semi-persistent scheduled (SPS) resources for transmission of acknowledgment feedback or scheduling requests; and wherein the second priority is associated with a configured uplink grant for uplink communications of the second priority.

Aspect 13: The method of aspect 12, wherein the configured uplink grant is for transmission of one or more of a lower priority scheduling request, a lower priority channel state information transmission, lower priority acknowledgment feedback, or any combinations thereof.

Aspect 14: A method for wireless communication at a base station, comprising: configuring a plurality of configured uplink resources for uplink communications of a first priority from a UE to the base station; determining that a first configured uplink resource of the plurality of configured uplink resources at least partially overlaps with a second uplink resource of a second uplink communication of a second priority that is lower than the first priority; cancelling, based at least in part on the determining, at least a portion of the second uplink communication starting before or at a first symbol of the second uplink resource that overlaps with a first symbol of the first configured uplink resource; and receiving a first uplink communication of the first priority via the first configured uplink resource.

Aspect 15: The method of aspect 14, wherein the plurality of configured uplink resources for uplink communications of the first priority comprise semi-persistent scheduled (SPS) resources for transmission of the uplink communications of the first priority, and the second uplink communication is a dynamically granted uplink communication of the second priority.

Aspect 16: The method of aspect 15, wherein the uplink communications of the first priority comprise high priority (HP) acknowledgment feedback for one or more HP downlink transmissions, or a HP scheduling request (SR) transmission of the UE.

Aspect 17: The method of any of aspects 15 through 16, wherein the dynamically granted uplink communication of the second priority is for a lower priority physical uplink shared channel transmission or a lower priority physical uplink control channel transmission carrying acknowledgment feedback information.

Aspect 18: The method of any of aspects 14 through 17, wherein the plurality of configured uplink resources for uplink communications of the first priority comprise semi-persistent scheduled (SPS) resources for transmission of acknowledgment feedback or scheduling requests; and wherein the second uplink resource is a semi-persistent uplink resource for uplink communications of the second priority.

Aspect 19: The method of aspect 18, wherein the semi-persistent uplink resource is for transmission of one or more of a lower priority scheduling request, a lower priority channel state information transmission, lower priority acknowledgment feedback, or any combinations thereof.

Aspect 20: A method for wireless communication at a base station, comprising: transmitting, to a UE, configuration information for a plurality of configured uplink resources for uplink communications of a first priority from the UE to the base station, wherein an uplink grant from the base station for an uplink communication of a second priority that is lower than the first priority is expected only to use uplink resources that are non-overlapping with a first configured uplink resource of the plurality of configured uplink resources; transmitting, to the UE, a first uplink grant for a first uplink communication with a second priority that is higher than the first priority, the first uplink grant indicating first uplink resources that at least partially overlap with the first configured uplink resource; and receiving the first uplink communication using the first uplink resources.

Aspect 21: The method of aspect 20, wherein the UE is not expected to be scheduled with a PUCCH of a lower priority carrying acknowledgment feedback information in response to an PDSCH without a corresponding PDCCH overlapping with a PUCCH transmission or a PUSCH transmission of a higher priority.

Aspect 22: The method of any of aspects 20 through 21, wherein the plurality of configured uplink resources for uplink communications of the first priority comprise semi-persistent scheduled (SPS) resources for transmission of the uplink communications of the first priority, and the first uplink communication of the second priority is a dynamically granted uplink communication of the second priority.

Aspect 23: The method of aspect 22, wherein the uplink communications of the first priority comprise high priority (HP) acknowledgment feedback for one or more HP downlink transmissions, or a HP scheduling request (SR) transmission to the base station.

Aspect 24: The method of any of aspects 22 through 23, wherein the UE does not expect to receive a dynamically granted uplink communication of the second priority for a physical uplink shared channel transmission or a physical uplink control channel transmission carrying acknowledgment feedback information.

Aspect 25: The method of any of aspects 20 through 24, wherein the plurality of configured uplink resources for uplink communications of the first priority comprise semi-persistent scheduled (SPS) resources for transmission of acknowledgment feedback or scheduling requests; and wherein the uplink communication of the second priority is associated with a configured uplink grant for uplink communications of the second priority.

Aspect 26: The method of aspect 25, wherein the configured uplink grant is for transmission of one or more of a lower priority scheduling request, a lower priority channel state information transmission, lower priority acknowledgment feedback, or any combinations thereof.

Aspect 27: An apparatus for wireless communication at a UE, comprising a processor; memory coupled with the processor; and instructions stored in the memory and executable by the processor to cause the apparatus to perform a method of any of aspects 1 through 6.

Aspect 28: An apparatus for wireless communication at a UE, comprising at least one means for performing a method of any of aspects 1 through 6.

Aspect 29: A non-transitory computer-readable medium storing code for wireless communication at a UE, the code comprising instructions executable by a processor to perform a method of any of aspects 1 through 6.

Aspect 30: An apparatus for wireless communication at a UE, comprising a processor; memory coupled with the processor; and instructions stored in the memory and executable by the processor to cause the apparatus to perform a method of any of aspects 7 through 13.

Aspect 31: An apparatus for wireless communication at a UE, comprising at least one means for performing a method of any of aspects 7 through 13.

Aspect 32: A non-transitory computer-readable medium storing code for wireless communication at a UE, the code comprising instructions executable by a processor to perform a method of any of aspects 7 through 13.

Aspect 33: An apparatus for wireless communication at a base station, comprising a processor; memory coupled with the processor; and instructions stored in the memory and executable by the processor to cause the apparatus to perform a method of any of aspects 14 through 19.

Aspect 34: An apparatus for wireless communication at a base station, comprising at least one means for performing a method of any of aspects 14 through 19.

Aspect 35: A non-transitory computer-readable medium storing code for wireless communication at a base station, the code comprising instructions executable by a processor to perform a method of any of aspects 14 through 19.

Aspect 36: An apparatus for wireless communication at a base station, comprising a processor; memory coupled with the processor; and instructions stored in the memory and executable by the processor to cause the apparatus to perform a method of any of aspects 20 through 26.

Aspect 37: An apparatus for wireless communication at a base station, comprising at least one means for performing a method of any of aspects 20 through 26.

Aspect 38: A non-transitory computer-readable medium storing code for wireless communication at a base station, the code comprising instructions executable by a processor to perform a method of any of aspects 20 through 26.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    determining that a first configured uplink resource of a plurality of configured uplink resources for uplink communications of a first priority at least partially overlaps in time with a second uplink resource for uplink communications of a second priority that is lower than the first priority, wherein the plurality of configured uplink resources for uplink communications of the first priority comprise semi-persistent scheduled (SPS) resources for transmission of the uplink communications of the first priority, scheduling request resources, semi-persistent channel state information report resources, or physical uplink control channel resources, and wherein the second uplink communication of the second priority is a dynamically granted uplink communication;
    cancelling, based at least in part on the determining, at least a portion of a second uplink communication of the second priority, starting before or at a first symbol of the second uplink resource that overlaps with a first symbol of the first configured uplink resource; and
    transmitting a first uplink communication of the first priority via the first configured uplink resource.

2. The method of claim 1, wherein the uplink communications of the first priority comprise high priority (HP) acknowledgment feedback for one or more downlink transmissions, or a HP scheduling request (SR) transmission to an access network entity.

3. The method of claim 1, wherein the dynamically granted uplink communication of the second priority is for a physical uplink shared channel transmission or a physical uplink control channel transmission carrying acknowledgment feedback information of the second priority.

4. The method of claim 1, wherein:
    the plurality of configured uplink resources for uplink communications of the first priority comprise semi-persistent scheduled (SPS) resources for transmission of acknowledgment feedback or scheduling requests; and
    wherein the second uplink resource for uplink communications of the second priority is a semi-persistent uplink resource for uplink communications of the second priority.

5. The method of claim 4, wherein the semi-persistent uplink resource is for transmission of one or more of a lower priority scheduling request, a lower priority channel state information transmission, lower priority acknowledgment feedback, or any combinations thereof.

6. A method for wireless communication at a user equipment (UE), comprising:
    receiving configuration information for a plurality of configured uplink resources for uplink communications of a first priority from the UE wherein an uplink grant for an uplink communication of a second priority that is lower than the first priority is expected only to use uplink resources that are non-overlapping with a first configured uplink resource of the plurality of configured uplink resources, and wherein the UE is not expected to be scheduled with a physical uplink control channel (PUCCH) of a lower priority carrying acknowledgment feedback information in response to a physical downlink shared channel (PDSCH) without a corresponding PDCCH overlapping with a PUCCH transmission or a PUSCH transmission of a higher priority;
    receiving a first uplink grant for a first uplink communication with a third priority that is higher than the first priority, the first uplink grant indicating first uplink resources that at least partially overlap with the first configured uplink resource; and transmitting the first uplink communication using the first uplink resources.

7. The method of claim 6, wherein the plurality of configured uplink resources for uplink communications of the first priority comprise semi-persistent scheduled (SPS) resources for transmission of the uplink communications of the first priority.

8. The method of claim 7, wherein the uplink communications of the first priority comprise high priority (HP) acknowledgment feedback for one or more HP downlink transmissions, or a HP scheduling request (SR) transmission to an access network entity.

9. The method of claim 7, wherein the UE does not expect to receive a dynamically granted uplink communication of the second priority for a physical uplink shared channel transmission or a physical uplink control channel transmission carrying acknowledgment feedback information that overlaps with any of the plurality of configured uplink resources.

10. The method of claim 6, wherein:
the plurality of configured uplink resources for uplink communications of the first priority comprise semi-persistent scheduled (SPS) resources for transmission of acknowledgment feedback or scheduling requests; and
wherein the second priority is associated with a configured uplink grant for uplink communications of the second priority.

11. The method of claim 10, wherein the configured uplink grant is for transmission of one or more of a lower priority scheduling request, a lower priority channel state information transmission, lower priority acknowledgment feedback, or any combinations thereof.

12. A method for wireless communication at an access network entity, comprising:
configuring a plurality of configured uplink resources for uplink communications of a first priority from a user equipment (UE);
determining that a first configured uplink resource of the plurality of configured uplink resources at least partially overlaps with a second uplink resource of a second uplink communication of a second priority that is lower than the first priority, wherein the plurality of configured uplink resources for uplink communications of the first priority comprise semi-persistent scheduled (SPS) resources for transmission of the uplink communications of the first priority, and wherein the second uplink communication is a dynamically granted uplink communication of the second priority;
cancelling, based at least in part on the determining, at least a portion of the second uplink communication starting before or at a first symbol of the second uplink resource that overlaps with a first symbol of the first configured uplink resource; and
receiving a first uplink communication of the first priority via the first configured uplink resource.

13. The method of claim 12, wherein the uplink communications of the first priority comprise high priority (HP) acknowledgment feedback for one or more HP downlink transmissions, or a HP scheduling request (SR) transmission of the UE.

14. The method of claim 12, wherein the dynamically granted uplink communication of the second priority is for a lower priority physical uplink shared channel transmission or a lower priority physical uplink control channel transmission carrying acknowledgment feedback information.

15. The method of claim 12, wherein:
the plurality of configured uplink resources for uplink communications of the first priority comprise semi-persistent scheduled (SPS) resources for transmission of acknowledgment feedback or scheduling requests; and
wherein the second uplink resource is a semi-persistent uplink resource for uplink communications of the second priority.

16. The method of claim 15, wherein the semi-persistent uplink resource is for transmission of one or more of a lower priority scheduling request, a lower priority channel state information transmission, lower priority acknowledgment feedback, or any combinations thereof.

17. A method for wireless communication at an access network entity, comprising:
transmitting, to a user equipment (UE), configuration information for a plurality of configured uplink resources for uplink communications of a first priority from the UE, wherein an uplink grant for an uplink communication of a second priority that is lower than the first priority is expected only to use uplink resources that are non-overlapping with a first configured uplink resource of the plurality of configured uplink resources, and wherein the UE is not expected to be scheduled with a physical uplink control channel (PUCCH) of a lower priority carrying acknowledgment feedback information in response to a physical downlink shared channel (PDSCH) without a corresponding PDCCH overlapping with a PUCCH transmission or a PUSCH transmission of a higher priority;
transmitting, to the UE, a first uplink grant for a first uplink communication with a second priority that is higher than the first priority, the first uplink grant indicating first uplink resources that at least partially overlap with the first configured uplink resource; and
receiving the first uplink communication using the first uplink resources.

18. The method of claim 17, wherein the plurality of configured uplink resources for uplink communications of the first priority comprise semi-persistent scheduled (SPS) resources for transmission of the uplink communications of the first priority, and wherein the first uplink communication of the second priority is a dynamically granted uplink communication of the second priority.

19. The method of claim 18, wherein the uplink communications of the first priority comprise high priority (HP) acknowledgment feedback for one or more HP downlink transmissions, or a HP scheduling request (SR) transmission to the access network entity.

20. The method of claim 18, wherein the UE does not expect to receive a dynamically granted uplink communication of the second priority for a physical uplink shared channel transmission or a physical uplink control channel transmission carrying acknowledgment feedback information.

21. The method of claim 17, wherein:
the plurality of configured uplink resources for uplink communications of the first priority comprise semi-persistent scheduled (SPS) resources for transmission of acknowledgment feedback or scheduling requests; and
wherein the uplink communication of the second priority is associated with a configured uplink grant for uplink communications of the second priority.

22. The method of claim 21, wherein the configured uplink grant is for transmission of one or more of a lower priority scheduling request, a lower priority channel state information transmission, lower priority acknowledgment feedback, or any combinations thereof.

23. An apparatus for wireless communication at a user equipment (UE), comprising:
- a processor,
- memory coupled with the processor; and
- instructions stored in the memory and executable by the processor to cause the apparatus to:
  - determine that a first configured uplink resource of a plurality of configured uplink resources for uplink communications of a first priority at least partially overlaps in time with a second uplink resource for uplink communications of a second priority that is lower than the first priority, wherein the plurality of configured uplink resources for uplink communications of the first priority comprise semi-persistent scheduled (SPS) resources for transmission of the uplink communications of the first priority, scheduling request resources, semi-persistent channel state information report resources, or physical uplink control channel resources, and wherein the second uplink communication of the second priority is a dynamically granted uplink communication;
  - cancel, based at least in part on the determining, at least a portion of a second uplink communication of the second priority, starting before or at a first symbol of the second uplink resource that overlaps with a first symbol of the first configured uplink resource; and
  - transmit a first uplink communication of the first priority via the first configured uplink resource.

24. The apparatus of claim 23, wherein the uplink communications of the first priority comprise high priority (HP) acknowledgment feedback for one or more downlink transmissions, or a HP scheduling request (SR) transmission to an access network entity.

25. The apparatus of claim 23, wherein the dynamically granted uplink communication of the second priority is for a physical uplink shared channel transmission or a physical uplink control channel transmission carrying acknowledgment feedback information of the second priority.

26. An apparatus for wireless communication at a user equipment (UE), comprising:
- a processor,
- memory coupled with the processor; and
- instructions stored in the memory and executable by the processor to cause the apparatus to:
  - receive configuration information for a plurality of configured uplink resources for uplink communications of a first priority from the UE, wherein an uplink grant for an uplink communication of a second priority that is lower than the first priority is expected only to use uplink resources that are non-overlapping with a first configured uplink resource of the plurality of configured uplink resources, and wherein the UE is not expected to be scheduled with a physical uplink control channel (PUCCH) of a lower priority carrying acknowledgment feedback information in response to a physical downlink shared channel (PDSCH) without a corresponding PDCCH overlapping with a PUCCH transmission or a PUSCH transmission of a higher priority;
  - receiving a first uplink grant for a first uplink communication with a third priority that is higher than the first priority, the first uplink grant indicating first uplink resources that at least partially overlap with the first configured uplink resource; and
  - transmit the first uplink communication using the first uplink resources.

27. The apparatus of claim 26, wherein the plurality of configured uplink resources for uplink communications of the first priority comprise semi-persistent scheduled (SPS) resources for transmission of the uplink communications of the first priority.

28. The apparatus of claim 27, wherein the uplink communications of the first priority comprise high priority (HP) acknowledgment feedback for one or more HP downlink transmissions, or a HP scheduling request (SR) transmission to an access network entity.

29. The apparatus of claim 27, wherein the UE does not expect to receive a dynamically granted uplink communication of the second priority for a physical uplink shared channel transmission or a physical uplink control channel transmission carrying acknowledgment feedback information that overlaps with any of the plurality of configured uplink resources.

30. The apparatus of claim 26, wherein:
- the plurality of configured uplink resources for uplink communications of the first priority comprise semi-persistent scheduled (SPS) resources for transmission of acknowledgment feedback or scheduling requests; and
- wherein the second priority is associated with a configured uplink grant for uplink communications of the second priority.

31. The apparatus of claim 30, wherein the configured uplink grant is for transmission of one or more of a lower priority scheduling request, a lower priority channel state information transmission, lower priority acknowledgment feedback, or any combinations thereof.

* * * * *